United States Patent [19]

Isobe et al.

[11] Patent Number: 5,579,092

[45] Date of Patent: Nov. 26, 1996

[54] COLOR PRINTER CORRECTABLE POSITIONAL ERRORS IN RESPECTIVE PRINTING MECHANISMS

[75] Inventors: Minoru Isobe; Katsuyuki Ito; Kazuyoshi Yoshida; Noboru Otaki, all of Tokyo, Japan

[73] Assignee: Oki Electric Industry Co., Ltd., Tokyo, Japan

[21] Appl. No.: 402,234

[22] Filed: Mar. 10, 1995

[30] Foreign Application Priority Data

Mar. 14, 1994 [JP] Japan .................................. 6-042696
Jun. 8, 1994 [JP] Japan .................................. 6-126443

[51] Int. Cl.⁶ .................................................. G03G 21/00
[52] U.S. Cl. ...................... 355/208; 355/326 R; 347/116; 358/526
[58] Field of Search .............................. 355/326 R, 327, 355/271, 272, 273, 274, 208, 207; 346/157, 160; 347/116, 118; 358/526

[56] References Cited

U.S. PATENT DOCUMENTS 4,903,067 2/1990 Murayama et al. ..................... 346/160
4,912,491 3/1990 Hoshino et al. ........................ 346/160
4,937,664 6/1990 Chiku et al. .............................. 358/75

FOREIGN PATENT DOCUMENTS

| 1-40956 | 2/1989 | Japan | 355/326 A |
| 1-142673 | 6/1989 | Japan | 355/326 A |
| 1-270073 | 10/1989 | Japan | 355/326 A |
| 1-281468 | 11/1989 | Japan | 355/326 A |
| 2-153377 | 6/1990 | Japan | 355/326 A |

Primary Examiner—R. L. Moses
Attorney, Agent, or Firm—Panitch Schwarze Jacobs & Nadel, P.C.

[57] ABSTRACT

A color printer arranges respective printing mechanisms for printing yellow, magenta, cyan, black and rotatably arranges below the respective printing mechanisms a carrier belt attaching a recording medium thereto and moving it. The carrier belt is formed with timing marks, and photointerrupters are provided to read the timing marks. DIP switches are formed for setting positional errors of the respective printing mechanisms. Printing timings of the respective printing mechanisms are controlled on the basis of the read outputs of the timing marks from the photointerrupters and the set values in the DIP switches.

37 Claims, 16 Drawing Sheets

UNEXPOSED PORTION

EXPOSED PORTION

5,579,092

COLOR PRINTER CORRECTABLE POSITIONAL ERRORS IN RESPECTIVE PRINTING MECHANISMS

CROSS-REFERENCE TO RELATED APPLICATION

This application claims priority benefits under 35 U.S.C §119 of Japanese Patent Applications No. Hei 06-042,696, filed Mar. 14th, 1994, and No. Hei 06-126,443 filed Jun. 8th, 1994, the entire disclosure of which are incorporated herein by reference.

BACKGROUND OF THE INVENTION

1. Field of the Invention

The present invention relates to a color printer for performing multicolor printing on recording media and, more particularly, to a color printer arranging plural printing mechanisms and forming color images by sequentially printing with different colors.

2. Description of Related Art

A color printer has been proposed, as a conventional printer apparatus of such a type, which arranging plural printing mechanisms and sequentially printing respective colors, namely, yellow, magenta, cyan, and black. An electrophotographic print mechanism, for example, is used as a printing mechanism for such a color printer to form image with four color toners by overlapping respective colors on a recording medium.

With the conventional color printer, however, if a recording position shifts due to such as less orderly mounted printing mechanisms, color printing with less positional accuracy occurs, and problems arise which the printer is unable to print wanted color recording.

Meanwhile, the resolution of printers tends to be finer these days because of demands on more distinctive color images. Consequently, it was very difficult for respective color printers to arrange printing mechanisms of respective colors without dispersions among products and with positional accuracy of dot unit.

SUMMARY OF THE INVENTION

It is an object, according to the present invention, to provide a color printer capable of high quality color printing by making positional errors in printing mechanisms of respective color correctable to be able to prevent color shifts or color misplacements from occurring.

The foregoing object is accomplished with a color printer in which plural printing mechanisms for multicolor printing are arranged to sequentially print on a recording medium to form color images and which includes: a medium carrier extendedly provided so as to be movable in arranged ranges of the plural printing mechanisms for attaching the recording medium thereto; driving means for driving the medium carrier so that the recording medium attached to the medium carrier moves to the arranged ranges of respective printing mechanisms; measuring means for measuring movement amounts of the medium carrier; error setting means for setting positional errors with respect to the printing mechanisms; and correcting means for correcting the movement amounts of the medium carrier on the basis of set values determined by the error setting means.

In another aspect of the invention, a color printer in which plural printing mechanisms for multicolor printing are arranged to sequentially print on a recording medium to form color images, includes: a medium carrier extendedly provided so as to be movable in arranged ranges of the plural printing mechanisms for attaching the recording medium thereto; driving means for driving the medium carrier so that the recording medium attached to the medium carrier moves to the arranged ranges of respective printing mechanisms; test pattern forming means for forming at once test patterns in use of the plural printing mechanisms for multicolor printing on a medium carrier which is driven by driving means; detecting means for detecting passages of the test patterns of the respective colors formed from the test pattern forming means; measuring means for measuring time differentials, detected with the detecting means, among the test patterns of the respective colors; and controlling means for seeking positional errors with respect to the printing mechanisms on the basis of the time differentials among the test patterns measured with the measuring means and for controlling printing start times.

In a further aspect, a color printer according to the invention, in which plural printing mechanisms for multicolor printing an arranged to sequentially print on a recording medium to form color images, includes: a medium carrier extendedly provided so as to be movable in arranged ranges of the plural printing mechanisms for attaching the recording medium thereto; driving means for driving the medium carrier so that the recording medium attached to the medium carrier moves to the arranged ranges of respective printing mechanisms; test pattern forming means for foraging at once test patterns on both sides in a moving direction of the medium carrier using the plural printing mechanisms; detecting means for measuring detection times among test patterns of an identical color formed from the test pattern forming means and for detecting passages of the test patterns of the respective colors; measuring means for measuring time differentials among the test patterns of the identical color and the respective colors on both sides with the detecting means; displaying means for seeking positional errors of the respective printing mechanisms on the basis of detected errors among the test patterns of the identical color measured with the measuring means and for displaying the positional errors; and controlling means for seeking positional errors with respect to the printing mechanisms on the basis of detected errors among the test patterns measured with the measuring means and for controlling printing start times.

According to a preferred embodiment of the present invention, the medium carrier is an endless stripe member to which the recording medium is attached electrically. The number of the plural printing mechanisms is four, and the printing mechanisms perform color printing of yellow, magenta, cyan, and black, respectively.

The measuring means can be made of timing marks provided on the stripe member, and detecting means for detecting the timing marks, or made of a slit disc being arranged at the driving means and rotating together with the movement of the stripe member, and detecting means for detecting slits of the slit disc. The error setting means may set positional errors in the moving direction of the medium carrier and in the direction perpendicular to the moving direction with respect to the printing mechanisms.

In accordance with the invention constituted above, the medium carrier attaching the recording medium thereto moves in an arranging direction of the plural printing mechanisms by drive of the driving means. Meanwhile, the error setting means has previously set positional errors of the printing mechanisms. The correcting means corrects the amount to be moved by the medium carrier based on the determined error values. The measuring means measures the movement of the medium carrier until it reaches the corrected movement amount of the printing mechanism, and printing starts when the movement reaches the corrected movement amount. This constitution gets rid of positional shifts between the recording medium and the printing mechanisms due to positional shifts of the printing mechanisms.

Setting errors in the moving direction of the medium carrier and in the direction perpendicular to the moving direction, as errors of the printing mechanisms, allows high accuracy positioning between the recording medium and the printing mechanisms.

BRIEF DESCRIPTION OF DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 1:
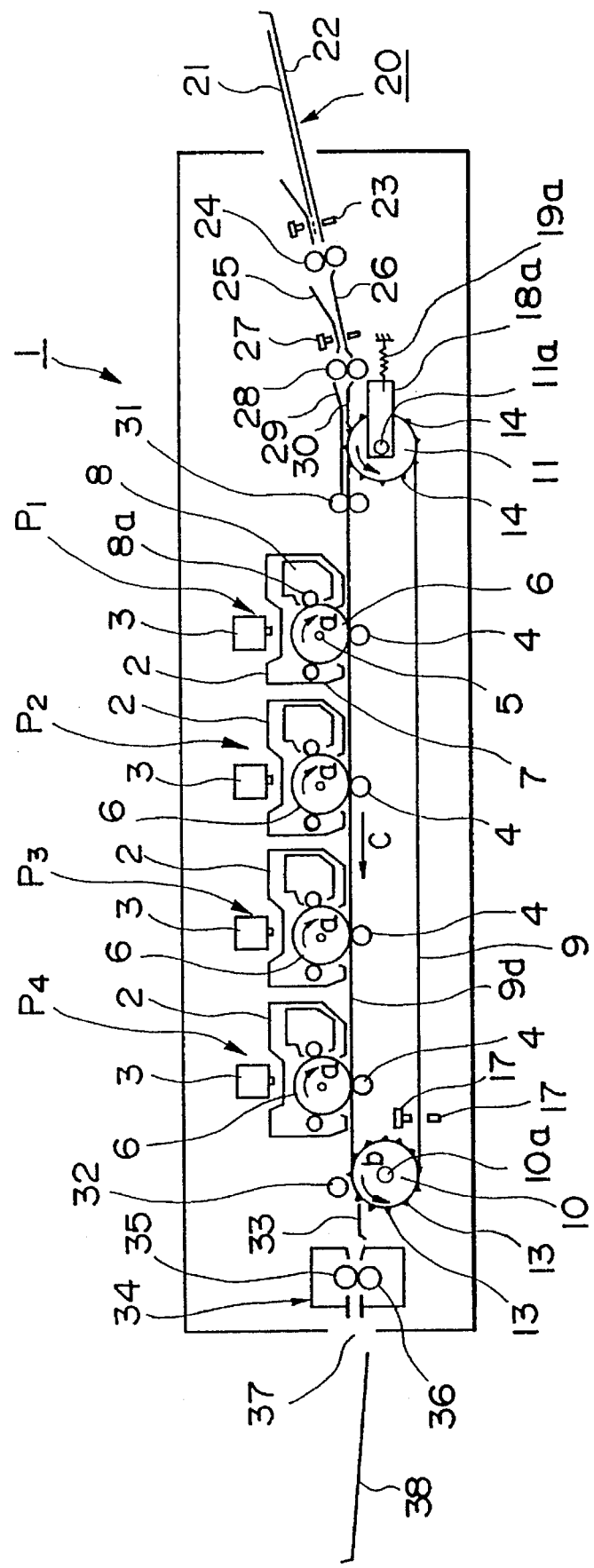
FIG. 1 is a descriptive diagram showing a color printer of a first embodiment according to the invention.

According to the drawings, there describes embodiments of the invention. The same reference number is assigned to common elements of the respective drawings. FIG. 1 is a descriptive diagram showing a color printer of a first embodiment according to the invention.

In FIG. 1, the color printer 1 arranges four sets of printing mechanisms $P_1$, $P_2$, $P_3$, $P_4$ juxtaposed from an input side to a delivery side of recording media. The first printing mechanisms $P_1$, the second printing mechanisms $P_2$, the third printing mechanisms $P_3$, and the fourth printing mechanisms $P_4$ are electricphotographic type LED (Light Emitting Device) printing mechanisms, each of which has identical constitution. There describes their constitution by exemplifying the printing mechanisms $P_1$.

The printing mechanisms $P_1$ is constituted of an image forming unit 2, an LED head 3 exposing a photosensitive dram described below according to image data, and a transfer roller 4 for transferring a toner image formed at the image forming unit 2 onto a recording medium. The image forming unit 2 has the photosensitive drum 6 rotatable around a shaft 5 in a direction of arrow a, a charging roller 7 for evenly charging the surface of the photosensitive drum 6, and a developer 8 for developing exposed portions of the photosensitive drum 6. The developer 8 has a rotatable developing roller 8a. The LED head 3 essentially includes an LED array, a drive IC for driving the LED array, and a selfoc lens array for collecting the light from the LED array. The LED head 3 makes the LED array emit according to an image data signal fed from an interface portion described below, exposes the surface of the photosensitive drum 6, and forms an electrostatic latent image on the surface of the photosensitive drum 6. A carrier belt is provided between the photosensitive drum 6 and the transfer roller 4 so as to be movable.

The developer 8 of the printing mechanisms $P_1$ contains yellow (Y) toner; the developer 8 of the printing mechanisms $P_2$ contains magenta (M) toner; the developer 8 of the printing mechanisms $P_3$ contains cyan (C) toner; and the developer 8 of the printing mechanisms $P_4$ contains black (B) toner. A yellow image signal in the color image signal is fed to the LED head 3 of the printing mechanisms $P_1$; A magenta image signal in the color image signal is fed to the LED head 3 of the printing mechanisms $P_2$; A cyan image signal in the color image signal is fed to the LED head 3 of the printing mechanisms $P_3$; and A black image signal in the color image signal is fed to the LED head 3 of the printing mechanisms $P_4$ contains black (B) toner.

Figure 2:
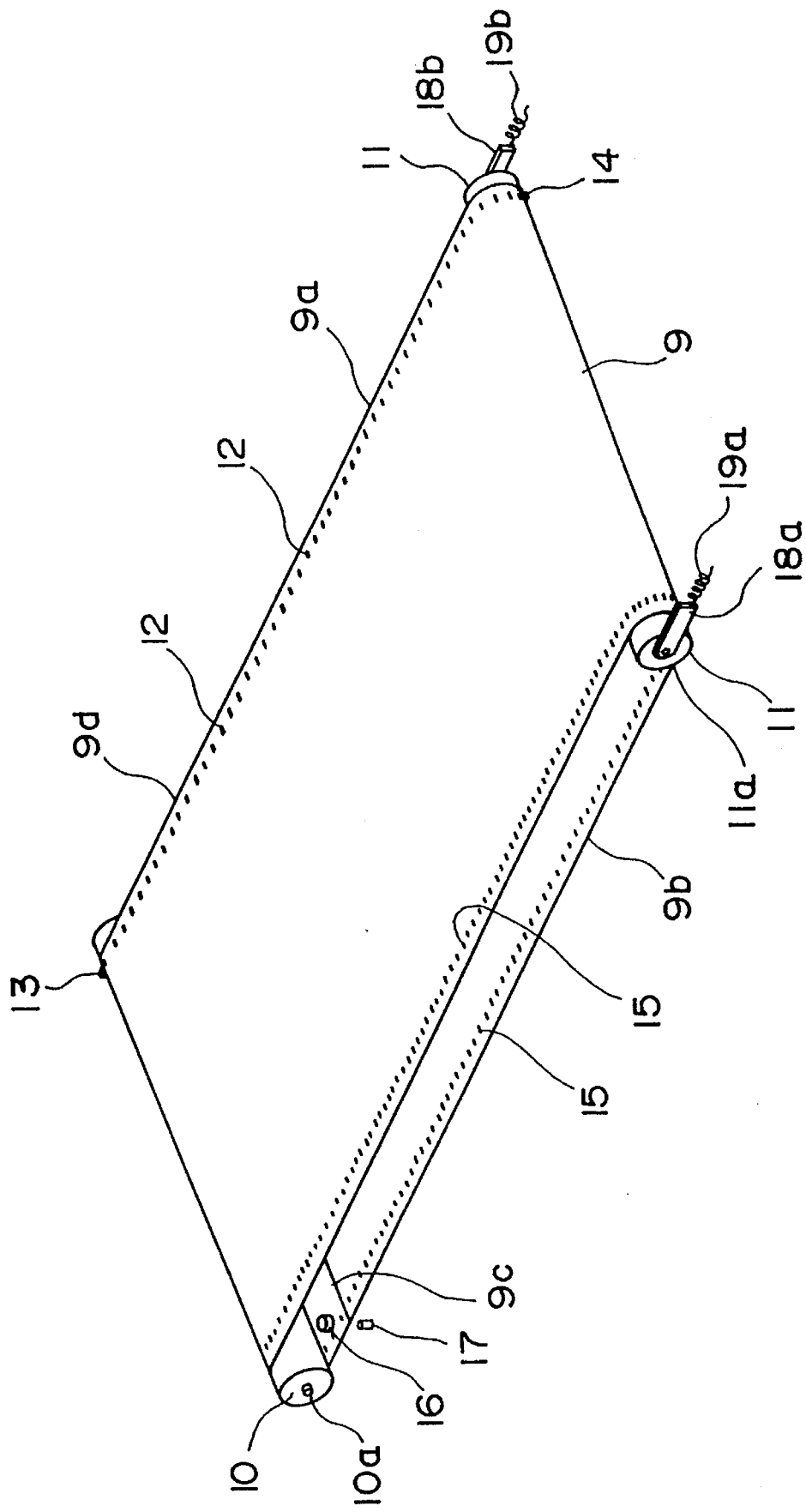
FIG. 2 is a perspective view showing a carrier belt in the first embodiment.

The carrier belt is wounded around a drive roller 10 and a tension roller 11. FIG. 2 is a perspective view showing a carrier belt for the first embodiment. Referring to FIGS. 1, 2, there describes the carrier belt.

The carrier belt 9 is made of a synthetic resin film capable of building up static and formed in an endless shape. On one side 9a of the carrier belt 9, sprocket holes 12 are formed with equal space therebetween. Sprocket pins 13, 14 formed on the rounded surfaces of the drive roller 10 and tension roller 11 engage with the sprocket holes 12. The carrier belt 9 moves in accurately following the rotation of the drive roller 10 without slips or skews under this sprocket drive system. On the other side 9b of the carrier belt 9, plural timing marks 15 in a stripe shape are placed with equal pitch therebetween. A home mark 16 is placed at a seam 9c of the carrier belt 9 for detection of the seam. A pair of photointerrupters 17 is arranged so as to sandwich the side end of the carrier belt 9b for detecting the timing marks 15 and the home mark 16.

The drive roller 10 is connected to a motor not shown and rotates around a shaft 10a in a direction of arrow b shown in FIG. 1 by the motor. Both ends of an shaft 11a of the tension roller 11 are projected, and guide plates 18a, 18b are rotatably attached to the projected ends. One ends of pulling coil springs 19a, 19b whose the other ends are engaged with a body of the printer 1 not shown are engaged with the guide plates 18a, 18b. The pulling coil spring 19a, 19b always pull the carrier belt 9 in a horizontal direction. The top portion 9d of the carrier belt 9 passes between the photosensitive drum 6 and transfer roller 4 of the respective printing mechanisms $P_1$, $P_2$, $P_3$, $P_4$.

In FIG. 1, a feeding mechanism 20 is provided on a right side of the printer 1. The feeding mechanism 20 introduces a recording medium 20 manually inserted by an operator into the printing mechanisms, and is constituted of a paper tray 22 on which the recording media 21 are put, a photointerrupter 23 detecting whether the recording medium 21 is on the paper tray 22, a pair of feeding rollers 24 for conveying the recording medium 21, guide shutes 25, 26 for guiding the recording medium 21, a second photointerrupter 27 for detecting the recording medium 21, a register roller 28 for correcting skews of the recording medium 21 and conveying it further inward, and guide shutes 29, 30 for guiding the recording medium 21 onto the carrier belt 9.

A pair of attaching rollers 31 is arranged between the guide shutes 29, 30 and the printing mechanisms $P_1$ so as to sandwich the top portion 9d of the carrier belt 9. The attaching rollers 31 charge the recording medium 21 fed from the feeding mechanism 20, and electrostatically attach it onto the top face of the carrier belt 9. A charge removal unit 32 is provided over the drive roller 10 via the carrier belt 9. The charge removal unit 32 makes the recording medium 21 attached to and conveyed by the carrier belt 9 discharge, releases the attached condition, and makes the medium separate easily from the carrier belt 9.

A guide plate 33 and a fixing unit 34 are provided on a left side of the charge removal unit 32. The fixing unit 34 fixes a toner image onto the recording medium 21 which has conveyed by the carrier belt 9 and onto which the toner image has been transferred, and includes a heat roller 35 heating the recording medium 21, and a pressure roller 36 for pressing the recording medium 21 together with the heat roller 35.

A delivery outlet 37 is formed on a left side of the fixing unit 34, and a delivery tray 38 is provide further outside. The recording media 21 already printed are delivered to the delivery tray 38.

Figure 3:
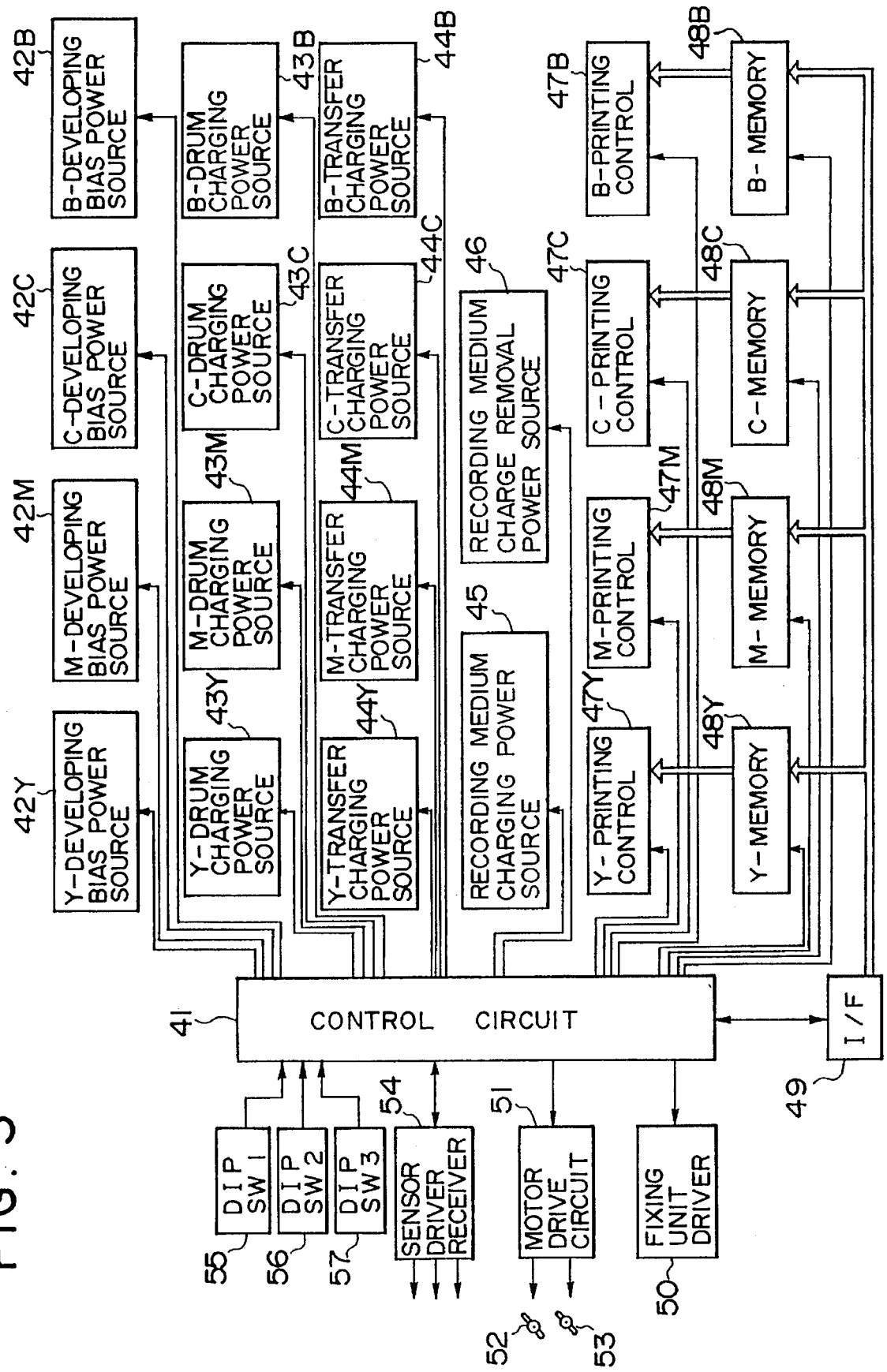
FIG. 3 is a block diagram showing a control system in the first embodiment.

FIG. 3 is a block diagram illustrating the control system for the color printer in this embodiment, and the control system is described as follows. In the drawings, numerals Y, M, C, B correspond to the respective printing mechanism consisted of the first printing mechanisms $P_1$, the second printing mechanisms $P_2$, the third printing mechanisms $P_3$, and the fourth printing mechanisms $P_4$.

In FIG. 3, a control circuit 41 is constituted of microprocessors, working memories, and whatever, and controls the entire operation of the printer 1. The control circuit 41 is connected to bias power sources 42Y, 42M, 42C, 42B for the developing roller 8a of the developer 8 of the respective printing mechanisms $P_1$, $P_2$, $P_3$, $P_4$, charging power sources 43Y, 43M, 43C, 43B for power supply to the charging roller 7 of the respective printing mechanisms $P_1$, $P_2$, $P_3$, $P_4$, and transfer charging power sources 44Y, 44M, 44C, 44B for supplying power to charge the transfer roller 4 of the respective printing mechanisms $P_1$, $P_2$, $P_3$, $P_4$. The control circuit 41 is further connected to a charging power source 45 for supplying charging electrical power to the attaching rollers 31, and a high voltage power source 46 for supplying a high voltage for removal of charges to the charge removal unit 32. Each of the power sources above is controlled to be on and off according to the instructions from the control circuit 41.

The control circuit 41 is, furthermore, connected to printing control circuits 47Y, 47M, 47C, 47B and memories 48Y, 48M, 48C, 48B corresponding to the respective printing mechanisms $P_1$, $P_2$, $P_3$, $P_4$. These printing control circuits 47Y, 47M, 47C, 47B receive image data from the memories 48Y, 48M, 48C, 48B, transmit those data to the respective LED head 3 upon the instruction from the control circuit 41 to control exposing time and the like of the LEDs, and controls formation of electrostatic latent images on the surface of the photosensitive drum 6. The memories 48Y, 48M, 48C, 48B store image data transmitted from an external device through the interface portion 49.

The interface portion 49 decomposes with respect to colors the image data transmitted from an external device, such as a host computer, and then: yellow image data are stored in the memory 48Y; magenta image data in the memory 48M; cyan image data in the memory 48C; black image data in the memory 48B.

A fixing unit driver 50 drives a heater not shown within the heat roller 35 so as to maintain the temperature of the heat roller 35 in the fixing unit 34. A motor drive circuit 51 drives a motor rotating the feeding roller 24, and a motor 53 for rotating the register roller 28, the photosensitive drums 6 of the respective printing mechanisms $P_1$, $P_2$, $P_3$, $P_4$, the charging roller 7, the developing roller 8a, the attaching rollers 31, the drive roller 10, and the heat roller 35. The respective rollers rotated by the motor 53 are connected by gears or belts not shown.

A sensor driver receiver 54 drives the photointerrupters 17, 23, 27, receives their output waveforms, and sends them to the control circuit 41. DIP (dual-in-line) switches 55, 56, 57 are to set installment errors among the printing mechanisms from the outside for correcting color shifts with respect to the colors in a main scanning direction (a direction perpendicular to a direction of arrow c) and in a sub scanning direction (the direction of arrow c). The DIP switch 55 sets installment errors between the first printing mechanisms $P_1$ and the second printing mechanisms $P_2$ to adjust color shift errors between the first printing mechanisms $P_1$ and the second printing mechanisms $P_2$. The DIP switch 56 sets installment errors between the second printing mechanisms $P_2$ and the third printing mechanisms $P_3$ to adjust color shift errors between the second printing mechanisms $P_2$ and the third printing mechanisms $P_3$. The DIP switch 57 sets installment errors between the third printing mechanisms $P_3$ and the fourth printing mechanisms $P_4$ to adjust color shift errors between the third printing mechanisms $P_3$ and the fourth printing mechanisms $P_4$. The set values of the respective DIP switches 55, 56, 57 can be read at the control circuit 41.

Operation of printing of this embodiment is described as follows. First, upon power-on, after implementing a predetermined initialization, the control circuit 41 reads the set values of the DIP switches 55, 56, 57 and stores in its internal memory. The control circuit 41 then drives the fixing unit driver 50 to warm up the heat roller 35 inside the fixing unit 34 up to a predetermined temperature. The control circuit 41 controls the heat roller 35 to always keep a constant temperature.

When the heat roller 35 reaches the predetermined temperature, the control circuit 41 then drives the motor 53 through the motor drive circuit 51 to rotate the drive roller 10, thereby moving the carrier belt 9 in the direction of arrow c. The carrier belt 9 is moved until the photointerrupter 17 detects the home mark 16, and when the home mark 16 is detected, the control circuit 41 makes the motor 53 and thereby the carrier belt 9 stop. The initialization of the printer 1 thus ends, and the control circuit 41 waits for transmission of image data from the external apparatus through the interface portion 49.

When receiving image data sent from the external apparatus, or a host computer, through the interface portion 49, the control circuit 41 provides instructions to the interface portion 49 and the memories 48Y, 48M, 48C, 48B. Upon the instruction, the interface portion 49 decomposes with respect to the colors the received image data signal, and makes the memories 48Y, 48M, 48C, 48B corresponding to the respective colors store the image data with respect to the colors. That is, the yellow image data are stored in the memory 48Y; the magenta image data in the memory 48M, the cyan image data in the memory 48C; and the black image data in the memory 48B.

Figure 4:
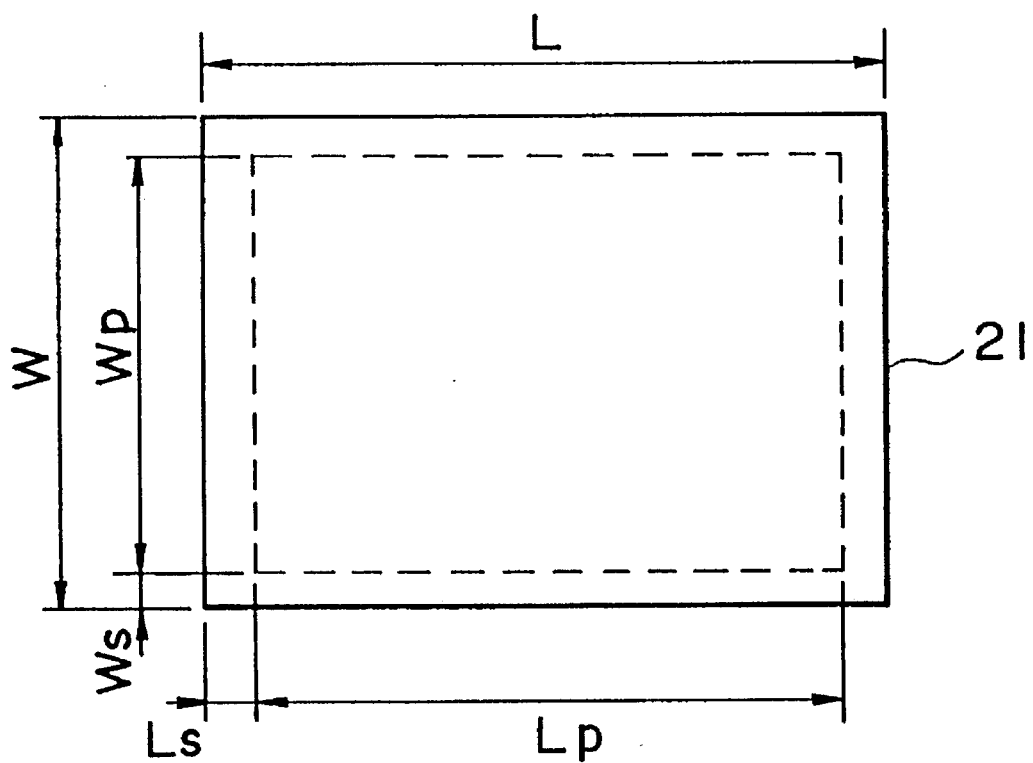
FIG. 4 is an illustration showing a printing range.

The respective memories 48Y, 48M, 48C, 48B memorize image data corresponding to the recording medium 21, respectively. That is, as shown in FIG. 4, they memorize the image data of an area by width Wp from a position width Ws away from the end of the medium 21 in the main scanning direction (width direction) and by length Lp from a position length Ls away from the end of the medium 21 in the sub scanning direction (length direction), in regard with the recording medium 21 having width W and length L. FIG. 4 is a descriptive diagram showing printing range of the recording medium; the solid line indicates the size of paper; the dot line indicates the printing area.

Figure 5:
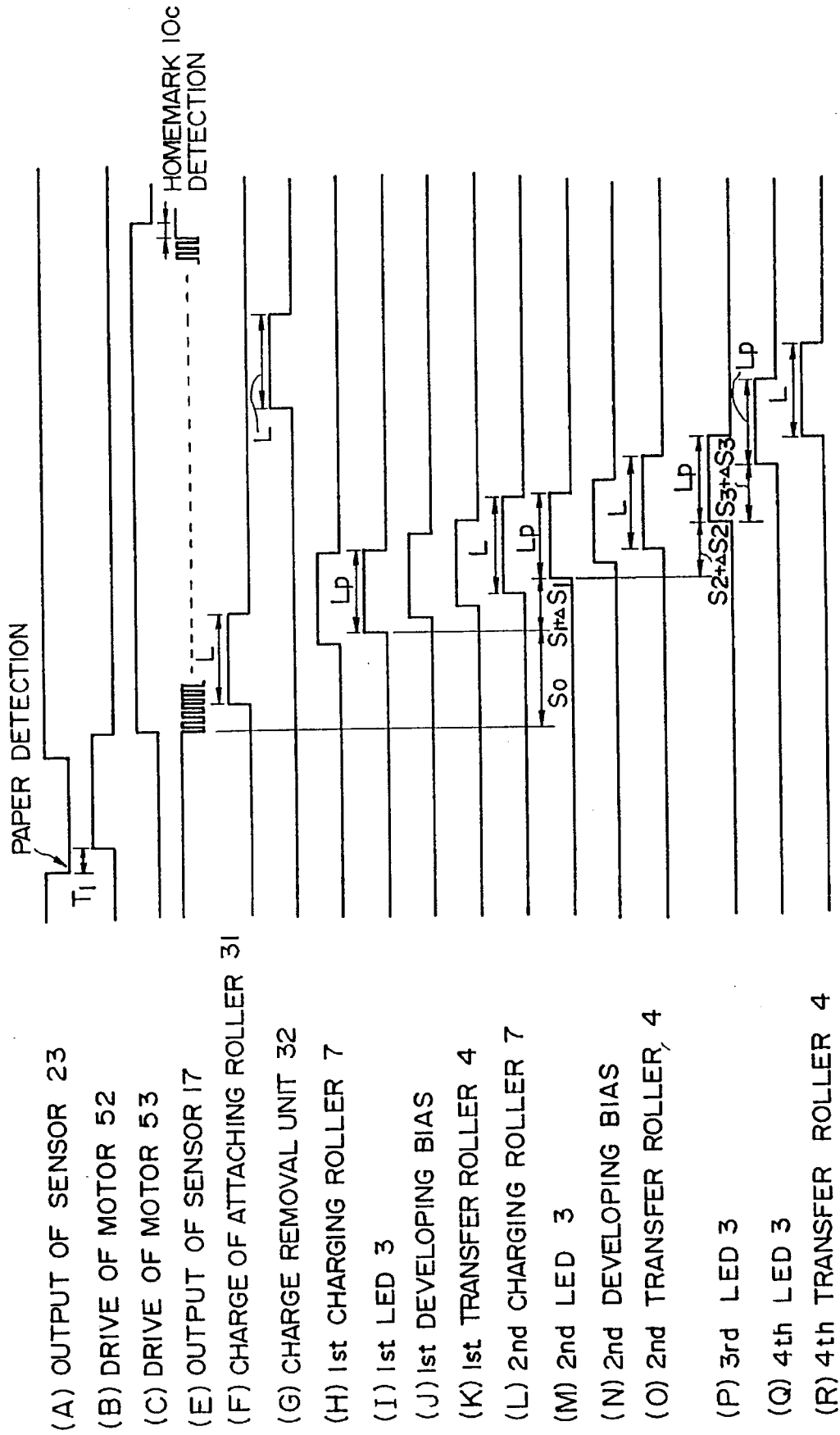
FIG. 5 is a time chart showing operation in the first embodiment.

Referring to FIG. 5, operation to print the image data from this situation is mainly described. FIG. 5 is a time chart showing printing operation of this embodiment.

When the operator manually feeds the recording medium 21 to the paper tray 22, the control circuit 41 detects that the photointerrupter 23 has detected the recording medium 21 (A in FIG. 5) by detecting output changes of the photointerrupter 23 through the sensor driver receiver 54. After time $T_1$ later from the detection of the recording medium 21, the control circuit 41 drives the motor 52 (B in FIG. 5) through the motor drive circuit 51, thereby rotating the feeding roller 24. The recording medium 21 is conveyed by rotation of the feeding roller 24 between the guide shutes 25, 26. The control circuit 41 then detects the front end of the recording medium 21 by the photointerrupter 27, and controls the motor drive circuit 51 (B in FIG. 5) so that the recording medium 21 is to be conveyed a little further than distance that the front end of the medium 21 reaches the register roller 28, from the time of that detection. The recording medium 21 thus enters a little bending condition while pushing its front end between rollers of the register roller 28, and skews of the recording medium 21 are corrected by bending of the medium.

The control circuit 41 then drives the motor 53 through the motor drive circuit 51, thereby rotating the register roller 28, the attaching rollers 31, the photosensitive drums 6 of the respective printing mechanisms $P_1$, $P_2$, $P_3$, $P_4$, the charging roller 7, the developing roller 8a, the transfer roller 4, the drive roller 10, and the heat roller 35 in the fixing unit 34, respectively (C in FIG. 5). When the drive roller 10 rotates, the carrier belt 9 moves in the direction of arrow c in FIG. 1, and the photointerrupter 17 reads the timing marks 15 provided on the carrier belt 9 (E in FIG. 5). The motor 53 continues to rotate, as shown in FIG. 5, until when: the multicolor print is performed on the recording medium 21; the recording medium 21 is delivered to the delivery tray 38; and then the photointerrupter 17 detects the home mark 16.

The recording medium 21 whose front end has been pushed to the register roller 28 passes between the guide shutes 29, 30 by the register roller 28, and is sent toward the carrier belt 9. The carrier belt 9 is moved by the drive roller 10, and thereby the recording medium 21 is conveyed to the attaching rollers 31. When the front end of the recording medium 21 reaches the attaching rollers 31, the control circuit 41 turns on the charging power source 45 for recording media, thereby charging the recording medium 21 (F in FIG. 5). By this operation, the recording medium 21 is also charged through the attaching rollers 31, so that the recording medium 21 is attached to the carrier belt 9 by electrostatic force. Since the recording medium 21 is attached to the carrier belt 9, the recording medium 21 moves together with the carrier belt 9. The attaching rollers 31 continue to charge the medium 21 until the rear end of the recording medium 21 passes through the attaching rollers 31.

Whether the front end of the recording medium 21 reaches the attaching rollers 31 is judged from that the control circuit 41 reads through the sensor driver receiver 54 the read outputs from the photointerrupter 17 about the timing marks 15. That is, the control circuit 41 counts a number of the timing marks 15 read at the photointerrupter 17 and judges the time that the count number becomes a predetermined number as the time that the front end of the recording medium 21 reaches the attaching rollers 31. Similarly, whether the rear end of the recording medium 21 passes through the attaching rollers 31 is judged from that the control circuit 41 reads through the sensor driver receiver 54 the read outputs from the photointerrupter 17 about the timing marks 15.

Next, the charging power source 43Y for the charging roller 7 of the first printing mechanism $P_1$ is turned on, thereby charging the charging roller 7, and thereby charging the surface of the photosensitive drum 6 (H in FIG. 5). The photosensitive drum 6 rotates in the direction of arrow a by rotation of the motor 53, so that the surface of the photosensitive drum 6 is evenly charged. The control circuit 41 then provides an instruction to the memory 48Y in which the yellow image data are stored to send the yellow image data of width Wp corresponding to one line from the memory 48Y to the printing control circuit 47Y of the printing mechanism. The printing control circuit 47Y of the first printing mechanism, according to the instruction from the control circuit 41, transforms the image data transmitted from the memory 48Y into data in the form receivable by the LED head 3 of the first printing mechanism and transmits the data to the LED head 3. The LED head 3 turns on LEDs corresponding to the transmitted image data, and forms a latent image of one line portion corresponding to the image data on the charged surface of the photosensitive drum 6. The yellow image data transmitted line by line from the memory 48Y are electrostatically made to be a latent image sequentially on the surface of the photosensitive drum 6, and exposing finishes when the yellow image data of a length Lp portion in the sub scanning direction are made to be latent (I in FIG. 5).

Exposing start time of the LED head 3 is determined, as shown in FIG. 5, by counting up the number of the timing marks 15 read by the photointerrupter 17 until the end of period $S_0$. The control circuit 41 turns on the bias power source 42Y for the developer 8 of the first printing mechanism $P_1$ with a little delay from the time of turning on of the charging power source 43Y (J in FIG. 5). This operation charges the developing roller 8a of the first printing mechanisms $P_1$. The yellow toner clung to the charged developing roller 8a clings to the photosensitive drum's surface on which an electrostatic latent image is formed. The electrostatic latent image is developed sequentially with the yellow toner according to the rotation of the photosensitive drum 6.

The control circuit 41 turns on the transfer charging power source 44Y of the first printing mechanism $P_1$ when the front end of the recording medium 21 reaches between the photosensitive drum 6 and the transfer roller 4 (K in FIG. 5). This operation electrically transfers the toner image on the surface of the photosensitive drum 6 onto the recording medium 21 by the charged transfer roller 4. The toner image is sequentially transferred onto the recording medium 21 by the rotation of the photosensitive drum 6, and finally, the yellow toner image in a range of Wp×Lp shown in FIG. 4 is transferred. Thus, the transfer of the yellow toner image onto the recording medium 21 by the first printing mechanism $P_1$ ends.

The carrier belt 9 continues to move, and the recording medium 21 is conveyed from the first printing mechanism $P_1$ to the second printing mechanism $P_2$, so that the second printing mechanism $P_2$ transfers a magenta toner image.

The control circuit 41, as well as the case of the printing mechanism $P_1$, turns on the charging power source 43M for the charging roller 7 of the second printing mechanism $P_2$, thereby charging the charging roller 7, and thereby charging the surface of the photosensitive drum 6 (L in FIG. 5). The control circuit 41 have the magenta image data transmitted from the memory 48M to the printing control circuit 47M of the second printing mechanism $P_2$ and further transmitted to the LED head 3. The LED head 3 turns on LEDs corresponding to the transmitted image data (M in FIG. 5).

Exposing start time of the LED head 3 of the second printing mechanism $P_2$ is determined by counting up the number of the timing marks 15 read by the photointerrupter 17 to the end of the period $S_1$ shown in FIG. 5 from the exposing start time of the LED head 3 of the first printing mechanism $P_1$, where no error due to installment errors or less accuracy of parts exist between the first printing mechanism $P_1$ and the second printing mechanism $P_2$. On the other hand, where there are errors due to installment errors or less accuracy of parts as described above, color shifts may occur between the first printing mechanism $P_1$ and the second printing mechanism $P_2$. In this embodiment, an error portion $\Delta S_1$ in the sub scanning direction due to installment errors or less accuracy of parts is previously set by the DIP switch 55. The control circuit 41 reads the set value $\Delta S_1$ at the time of initialization.

Accordingly, the control circuit 41 counts up the number of the timing marks 15 read by the photointerrupter 17 during the period $S_1+\Delta S_1$, from the exposing start time of the LED head 3 of the first printing mechanism $P_1$ to the exposing start time of the LED head 3 of the second printing mechanism $P_2$. This operation can correct positional shifts of printing in the sub scanning direction.

Regarding error portions due to installment errors or less accuracy of parts between the first printing mechanism $P_1$ and the second printing mechanism $P_2$ in the main scanning direction, the DIP switch 55 has previously set the error portions. The control circuit 41 sends the set value to the printing control circuit 47M corresponding to the second printing mechanism $P_2$, and the printing control circuit 47M corrects by one dot unit the exposing position of the LED head 3 on the basis of the set value sent. This operation can adjust the exposing start points Ws shown in FIG. 4 in the main scanning direction with one another within an error of one dot unit between the first printing mechanism $P_1$ and the second printing mechanism $P_2$.

It is to be noted that setting of the respective DIP switches 55, 56, 57 is performed by printing, for example, a predetermined test pattern and by detecting positional shifts in the main and sub scanning directions from the output result when the printer 1 is shipped from the factory or is subject to a maintenance. As a test pattern used at such a time, for example, a test pattern of "+" that two lines intersects with one another with the right angle is used so that positional shifts in both directions are detectable, and printing of yellow, magenta, cyan, and black are overlapped. A person who adjusts or performs maintenance services when the printer 1 is shipped from the factory or is subject to the maintenance, observes the printed result of the test pattern, measures amounts of color shifts, and sets error information in the respective DIP switches 55, 56, 57 in accordance with the color shift amounts.

As well as the case of the first printing mechanism $P_1$, the control circuit 41 turns on the bias power source 42M for the developer 8 of the second printing mechanism $P_2$ (N in FIG. 5) and turns on the transfer charging power source 44M of the second printing mechanism $P_2$ (O in FIG. 5). The second printing mechanism $P_2$ thus transfers the magenta toner image onto the recording medium 21. The recording medium 21 is moved to the third printing mechanism $P_3$ by the carrier belt 9, and then, the third printing mechanism $P_3$ transfers the cyan toner image.

The errors between the second printing mechanism $P_2$ and the third printing mechanism $P_3$ are previously set by the DIP switch 56 and has been read in the control circuit 41. The control circuit 41 counts up the number of the timing marks 15 read by the photointerrupter 17 during the period $S_2+\Delta S_2$, from the exposing start time of the LED head 3 of the second printing mechanism $P_2$ to the exposing start time of the LED head 3 of the third printing mechanism $P_3$. Notedly, $S_2$ is period (or distance) from the second printing mechanism $P_2$ to the third printing mechanism $P_3$, when no position error exists; $\Delta S_2$ is an error portion in the sub scanning direction set by the DIP switch 56. This operation can correct positional shifts in the sub scanning direction.

Regarding error portions due to installment errors or less accuracy of parts between the second printing mechanism $P_2$ and the third printing mechanism $P_3$ in the main scanning direction, similarly to above, the DIP switch 56 has previously set the error portions. The control circuit 41 sends the set value to the printing control circuit 47C corresponding to the third printing mechanism $P_3$, and the printing control circuit 47C corrects by one dot unit the exposing position of the LED head 3 on the basis of the set value sent.

After thus correcting the positional shifts, the LED head 3 performs its exposure (P in FIG. 5), and subsequently, the control circuit 41 turns on the bias power source 42C for the developer 8 of the third printing mechanism $P_3$ and turns on the transfer charging power source 44C of the third printing mechanism $P_3$. The third printing mechanism $P_3$ thus transfers the cyan toner image onto the recording medium 21. The recording medium 21 is moved to the fourth printing mechanism $P_4$, and then, the fourth printing mechanism $P_4$ transfers the black toner image.

The errors between the third printing mechanism $P_3$ and the fourth printing mechanism $P_4$ are previously set by the DIP switch 57 and has been read in the control circuit 41. The control circuit 41 counts up the number of the timing marks 15 read by the photointerrupter 17 during the period $S_3+\Delta S_3$, from the exposing start time of the LED head 3 of the third printing mechanism $P_3$ to the exposing start time of the LED head 3 of the fourth printing mechanism $P_4$. Notedly, $S_3$ is period (or distance) from the third printing mechanism $P_3$ to the fourth printing mechanism $P_4$, when no position error exists; $\Delta S_3$ is an error portion in the sub scanning direction set by the DIP switch 57. This operation can correct positional shifts in the sub scanning direction.

Regarding error portions due to installment errors or less accuracy of parts between the third printing mechanism P$_3$ and the fourth printing mechanism P$_4$ in the main scanning direction, similarly to above, the DIP switch 57 has previously set the error portions. The control circuit 41 sends the set value to the printing control circuit 47B corresponding to the fourth printing mechanism P$_4$, and the printing control circuit 47B corrects by one dot unit the exposing position of the LED head 3 on the basis of the set value sent.

After thus correcting the positional shifts, the LED head 3 performs its exposure (Q in FIG. 5), and subsequently, the control circuit 41 turns on the bias power source 42B for the developer 8 of the fourth printing mechanism P$_4$ and turns on the transfer charging power source 44B of the fourth printing mechanism P$_4$ (R in FIG. 5). The fourth printing mechanism P$_4$ thus transfers the black toner image onto the recording medium 21.

As described above, printing positions in the main and sub scanning directions are corrected, and the toner image of the respective colors is transferred onto the recording medium 21. Then, the recording medium 21 is carried by the carrier belt 9 to the charge removal unit 32, at which the control circuit 41 turns on the power source 46 for charge removal (G in FIG. 5), thereby removing charges of the recording medium 21. The recording medium 21 can easily separate from the carrier belt 9 by this operation, separates from the carrier belt 9 over the drive roller 10, and is guided to the fixing unit 34 with the guide shute 33. When the recording medium 21 separates from the charge removal unit 32, the control circuit 41 turns off the power source 46 for charge removal.

In the fixing unit 34, the toner image is fixed on the recording medium 21 by the heat roller 35 already reached a temperature enabling the roller to fix the toner and by the pressure roller 36 pressuring the heat roller 35. When finishing the fixing step, the recording medium 21 is delivered to the delivery tray 38.

The motor 53 continues to rotate, and then, the control circuit 41 stops the motor 53 through the motor drive circuit 51 when the photointerrupter 17 detects the home mark 16, or namely, at a time immediately after the seam 9c of the carrier belt 9 passed the drive roller 10. Moving the carrier belt 9 in such a manner above during printing allows the seam 9c of the carrier belt 9 not to contact with the photosensitive drums 6 of the respective printing mechanisms or the transfer roller 4 during printing. If the seam 9c contacts with the photosensitive drum 6 or the transfer roller 4 during printing, conductive substances may prevent the high charged voltage at the photosensitive drum 6 or the transfer roller from discharging where such conductive substances are contained in the fastening materials of the seam 9c of the carrier belt 9c, and furthermore, toner may be transferred defectively because the belt 9 at the seam 9c is thicker than any other portions. These problems will be averted.

Printing operation ends by operations above. In this embodiment, the image forming unit 2 of the respective printing mechanisms can implement developing and cleaning at the same time during the developing step, so that neither a cleaner or a waste toner box is necessary. The toner to be used is one component non-magnetic toner; the developing roller 8 has elasity and conductivity and slightly contacts with the surface of the photosensitive drum 6 through a thin layer of the non-magnetic toner. Developing is performed by clinging the toner to exposed portions on the surface of the photosensitive drum 6 exposed by the LED head 3, and cleaning is performed by pulling the remaining toner which is attached to unexposed portions to the surface of the developing roller 8a by strong electrical field. The cleaned toner is collected in the developer 8 and reused.

Figure 16A:
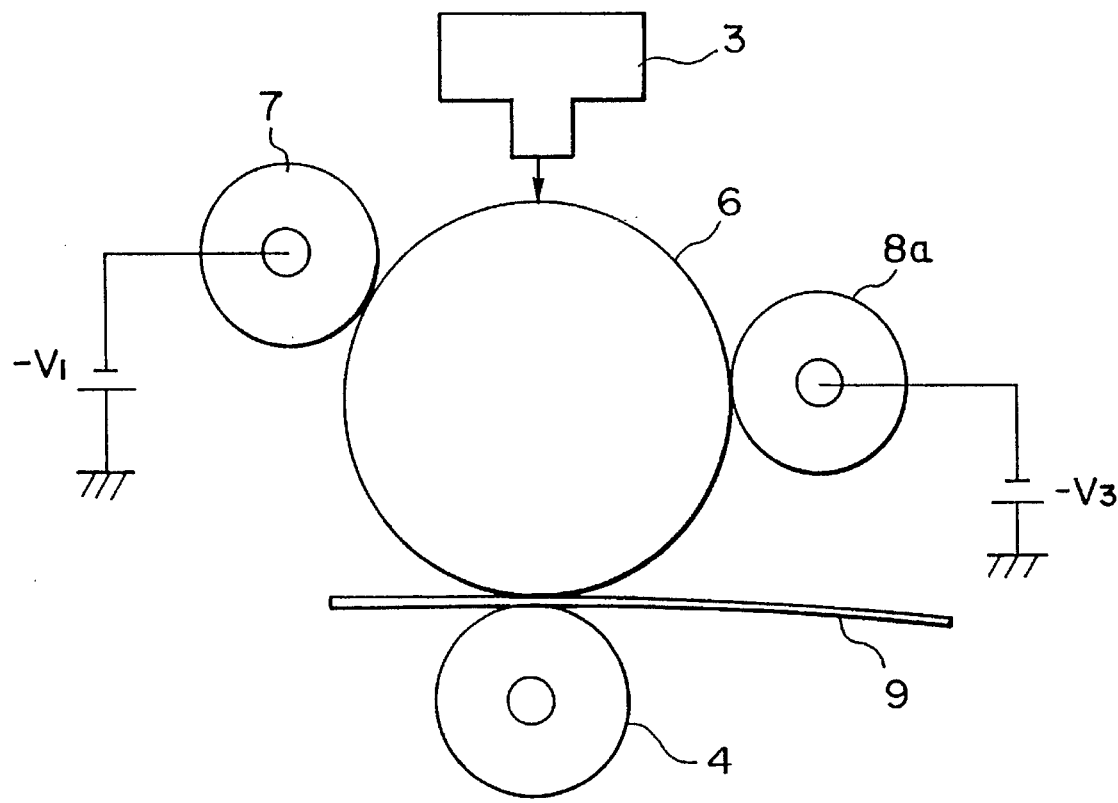
FIG. 16 is a descriptive diagram showing operation that developing and cleaning are implemented at the same time during a developing process.

FIG. 16 is descriptive diagram for describing a principle that in this embodiment neither a cleaner or a waste toner box described above is necessary. FIG. 16(a) shows an LED head 3, a transfer roller 4, a photosensitive drum 6, a charging roller 7 applied with −V1[V] voltage, a developing roller 8a applied with −V3[V] voltage, and a carrier belt 9.

The photosensitive drum 6 comes to have about −V2[V] potential at its exposed portions, and the respective potentials satisfy the following relationship.

$$-V2 > -V3 > -V1$$

Figure 16B:
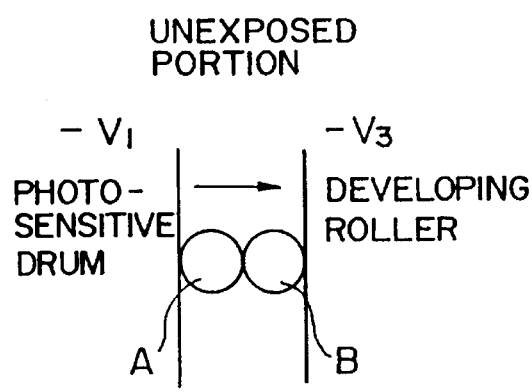

FIG. 16(b) shows a condition of remaining toner A at unexposed portions and toner B on the developing roller 8a. When the remaining toner A is located on the unexposed portions, the remaining toner A also has −V1 charges by charging. Therefore, the remaining toner A is collected in the developer 8 (see. FIG. 1) because the toner receives force pulling toward the developing roller 8a.

Figure 16C:
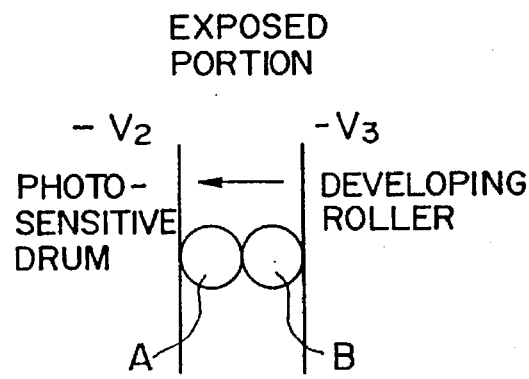

FIG. 16(c) shows a condition of remaining toner A at exposed portions and toner B on the developing roller 8a. When the remaining toner A is located on the exposed portions, the remaining toner A, as well as the toner B on the developing roller 8a, receives force pulling toward the photosensitive drum 6, so that the toner A, as well as newly developed toner, goes to the transfer step. Thus, the remaining toner A either is collected in the developer 8 or goes to the transfer step, and therefore, neither a cleaner or a waste toner box is necessary.

In the first embodiment, three DIP switches 55, 56, 57 are provided for setting error portions to correct positional shifts between printing mechanisms next to each other, so that the printer can respond finely, accurately to positional shifts among the printing mechanisms.

Although in the embodiment DIP switches are used to set errors, setting errors in the invention is not limited to use of such DIP switches. That is, error correction control in a manner similar to above may be performed, for example, by setting errors in use of an operation panel provided at the color printer for setting various functions and by storing the operation in a non-volatile memory or the like. The color printer may take a method in which a host computer connected to the color printer delivers on-line correction information which is similarly stored in a memory. A person who sets errors in the invention, thus, is not restricted to a specialized operator when the printer 1 is shipped or subject to maintenance services, and may be an end user using the color printer.

Although as the printing mechanism an apparatus having such an LED head is used in the embodiment above, a laser beam printer in which plural printing mechanisms are arranged or an electrophotographic printer using LCD shutters can be used. Moreover, an ink jet printer, which does not use an electrophotographic method, may be used.

Figure 6:
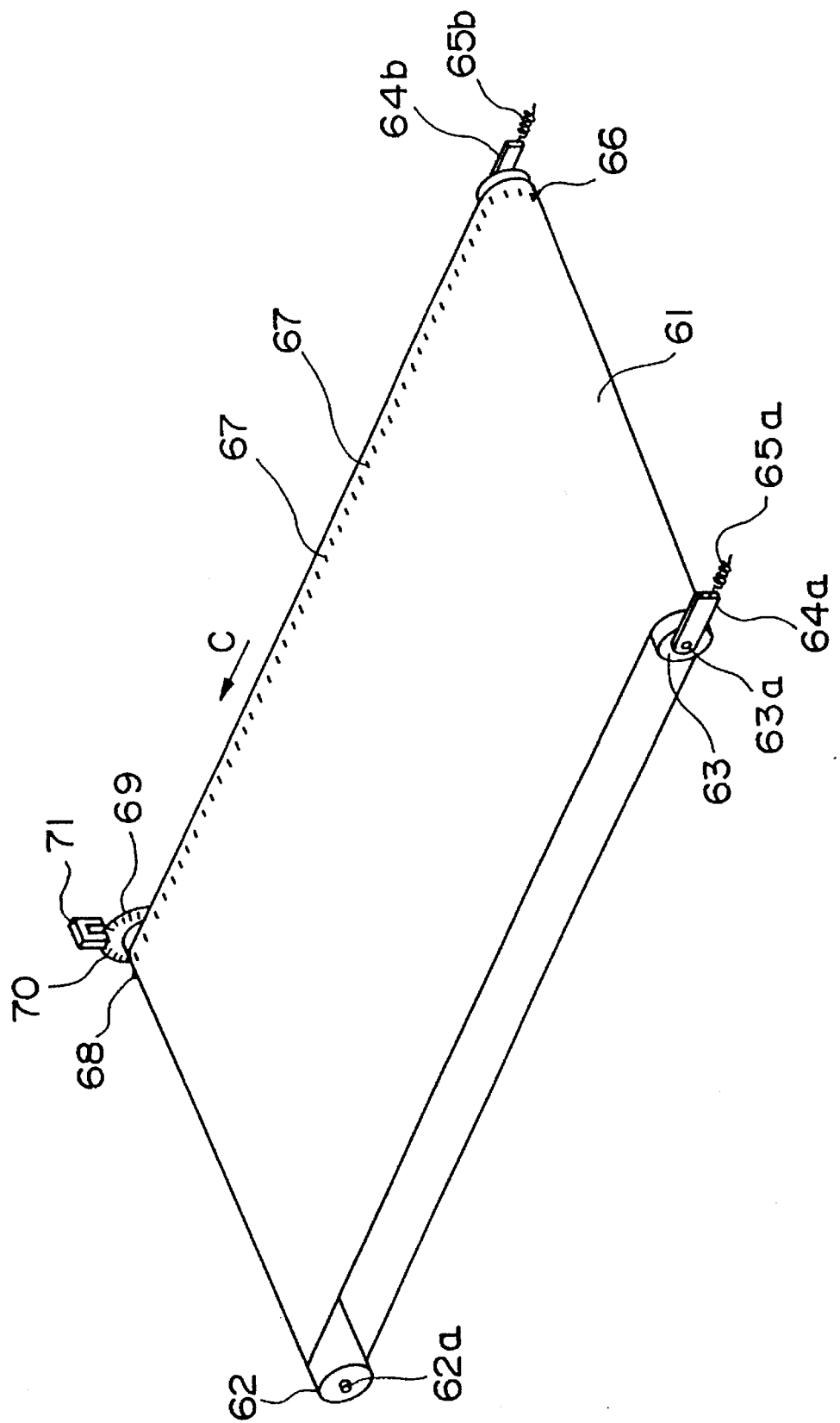
FIG. 6 is a perspective view showing a carrier belt in a second embodiment according to the invention.

A second embodiment according to the invention is described as follows. FIG. 6 is a perspective view showing a carrier belt in the second embodiment according to the invention. In the second embodiment, start timings for forming images can be set by providing a slit disc in coaxial with the drive roller for driving the carrier belt and by reading the slits formed in the slit disc with a photointerrupter, whereas in the first embodiment, timings for image forming start at the printing mechanisms of the respective colors are taken by providing timing marks on the carrier belt, reading the timing marks with a photointerrupter, and counting them up.

In FIG. 6, the carrier belt 61 in an endless shape is to attach a recording medium and to carry it, and is wounded around a drive roller 62 and a tension roller 63. Guide plates 64a, 64b are rotatably attached to both ends of a shaft 63a of the tension roller 63. One ends of pulling coil springs 65a, 65b whose the other ends are engaged with a body of the printer not shown are engaged with the guide plates 64a, 64b. The pulling coil spring 65a, 65b always pull the carrier belt 61 in a horizontal direction. The tension roller 63 is formed with sprocket pins 66, which engage with sprocket holes 67 in the carrier belt 61.

The drive roller 62 is connected to a motor not shown by which the roller 62 rotates around a shaft 62 as a center, thereby moving the carrier belt 61 in the direction of arrow c. Sprocket pins 68 are also formed on the drive roller 62, and the sprocket pins 68 engage with the sprocket holes 67 in the carrier belt 61. The shaft 62a of the drive roller 62 couples a slit disc 69. The slit disc 69 rotates together with the shaft 62a and is formed with slit holes 70 circumferentially arranged with equal space therebetween. A photointerrupter 71 is arranged so as to sandwich the outer end of the slit disc 69. The photointerrupter 71 is attached to an apparatus body not shown. Other constitution is almost the same as that in first embodiment, so its description is omitted.

In operation of the second embodiment, when the drive roller 62 is rotated by the motor not shown, the carrier belt 61 moves, and the slit disc 69 is also rotated in the same direction as of the drive roller 62. The photointerrupter 71 detects the slit holes 70 in the slit disc 69 and feeds it output to the control circuit not shown.

By moving of the carrier belt 61, the recording medium not shown is attached and conveyed. The conveyed amount of the recording medium is given from outputs of the photointerrupter 71. That is, the conveyed amount of the recording medium is controlled by counting at the control circuit the number of the slit holes 70 detected at the photointerrupter 71.

The second embodiment thus constituted enjoys the similar effects to the first embodiment. In particular, Ln the second embodiment, the carrier belt 61 does not require to have the timing marks, so that the second embodiment brings the effect that the carrier belt 61 is easily fabricated. The second embodiment is specially effective when a seamless, endless belt is used. That is, no home mark indicating a seam is required; moving of the carrier belt 61 can start from any position; and processing time will be shorten in the case of continuous printing. As a modification of the second embodiment, the sprocket holes 67 could be provided on both sides of the carrier belt 61, and sprocket pins corresponding to the holes could be formed on the drive roller 62 and the tension roller 63. If thus constituted, the carrier belt 61 would move more accurately.

Figure 7:
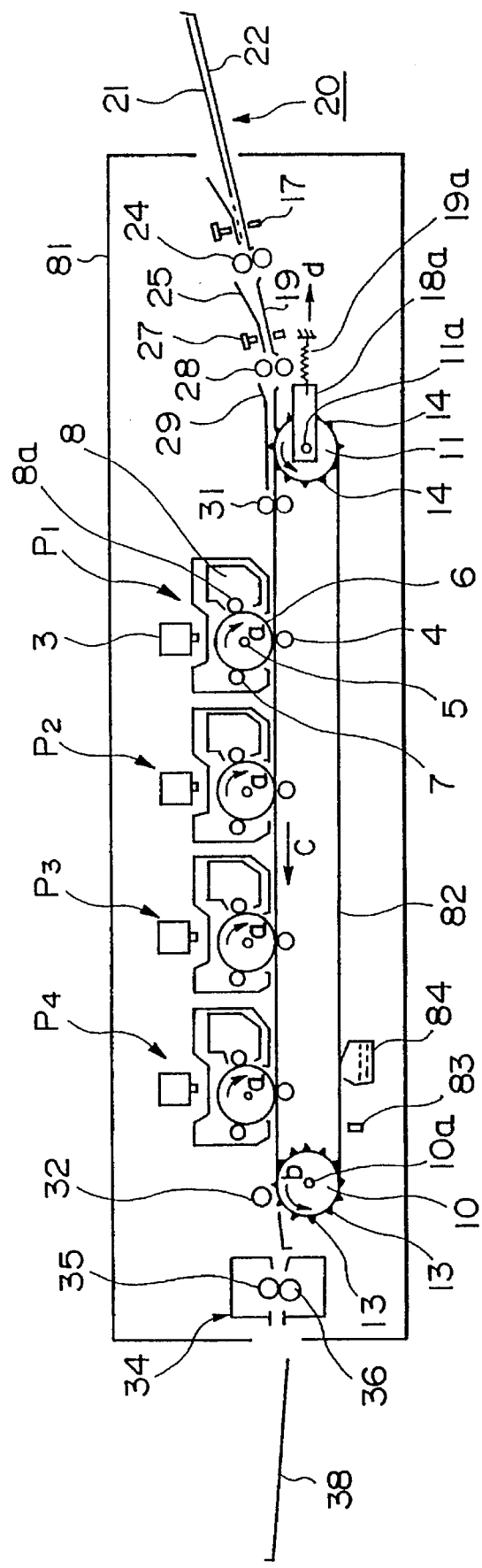
FIG. 7 is a descriptive diagram showing a color printer of a third embodiment.
Figure 8:
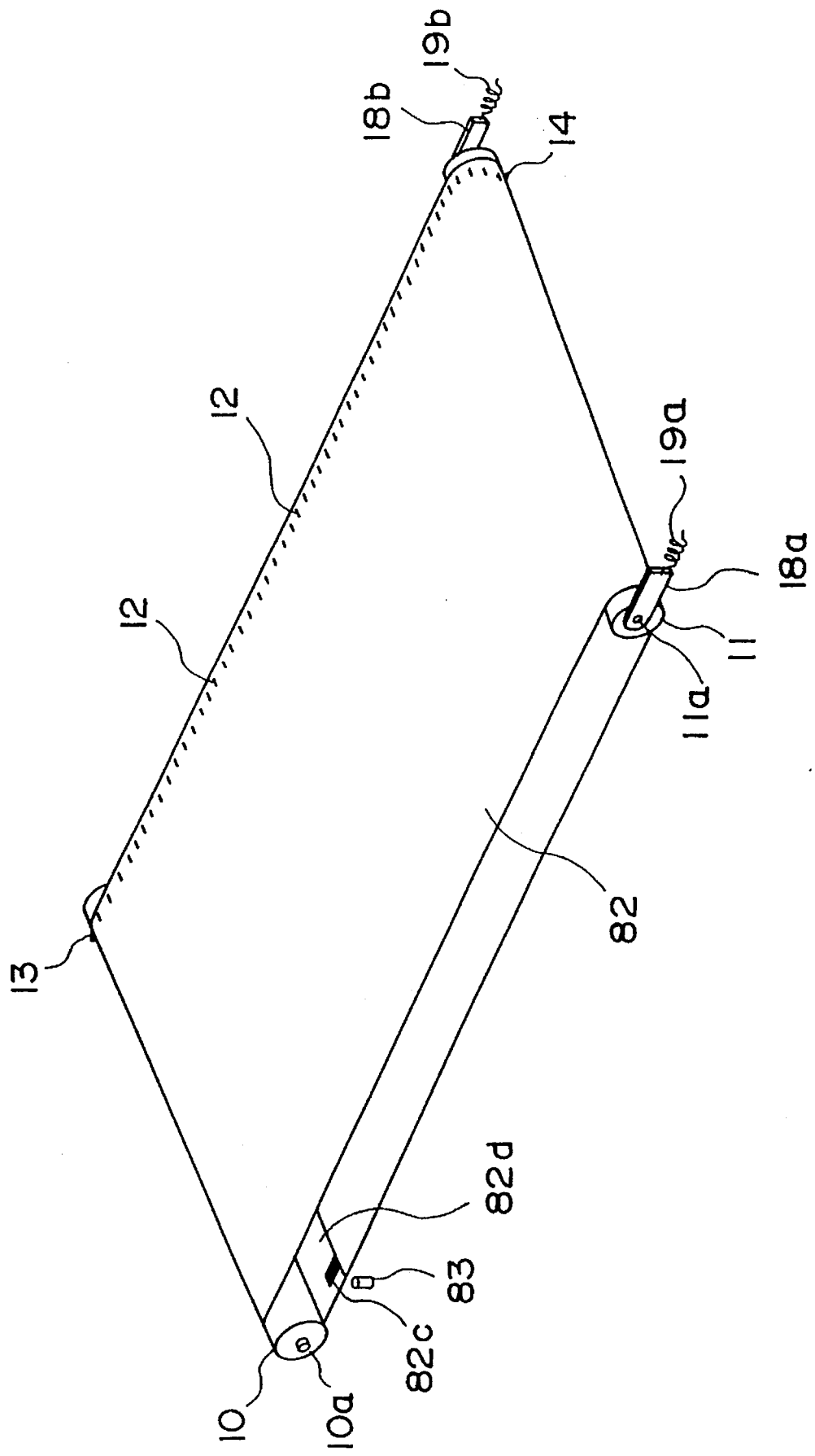
FIG. 8 is a perspective view showing a carrier belt in the third embodiment.

A third embodiment according to the invention is described as follows. FIG. 7 is a descriptive diagram showing a color printer of the third embodiment according to the invention. FIG. 8 is a perspective view showing a carrier belt in the third embodiment. The color printer of the third embodiment prints test patterns on the carrier belt at the respective printing mechanisms prior to the regular printing performance, measures errors among the printed test patterns, and adjusts installment errors of the respective printing mechanisms.

In FIGS. 7, 8, a carrier belt 82 for conveying a recording medium is wounded around the drive roller 10 and the tension roller 11 in a color printer 81 according to the third embodiment. The carrier belt 82, as well as the embodiments above, is made of a synthetic resin film capable of building up static to make toner for printing attachable thereto. A home mark 82c is provided adjacently to a seam 82d on the carrier belt 82, and a reflection type photosensor 83 is arranged below the carrier belt 82 to detect the home mark 82c or the like. A cleaning blade 84 is arranged so as to contact the carrier belt 82 below the carrier belt 82. The cleaning blade 84 removes remaining toner on the carrier belt 82.

Figure 9:
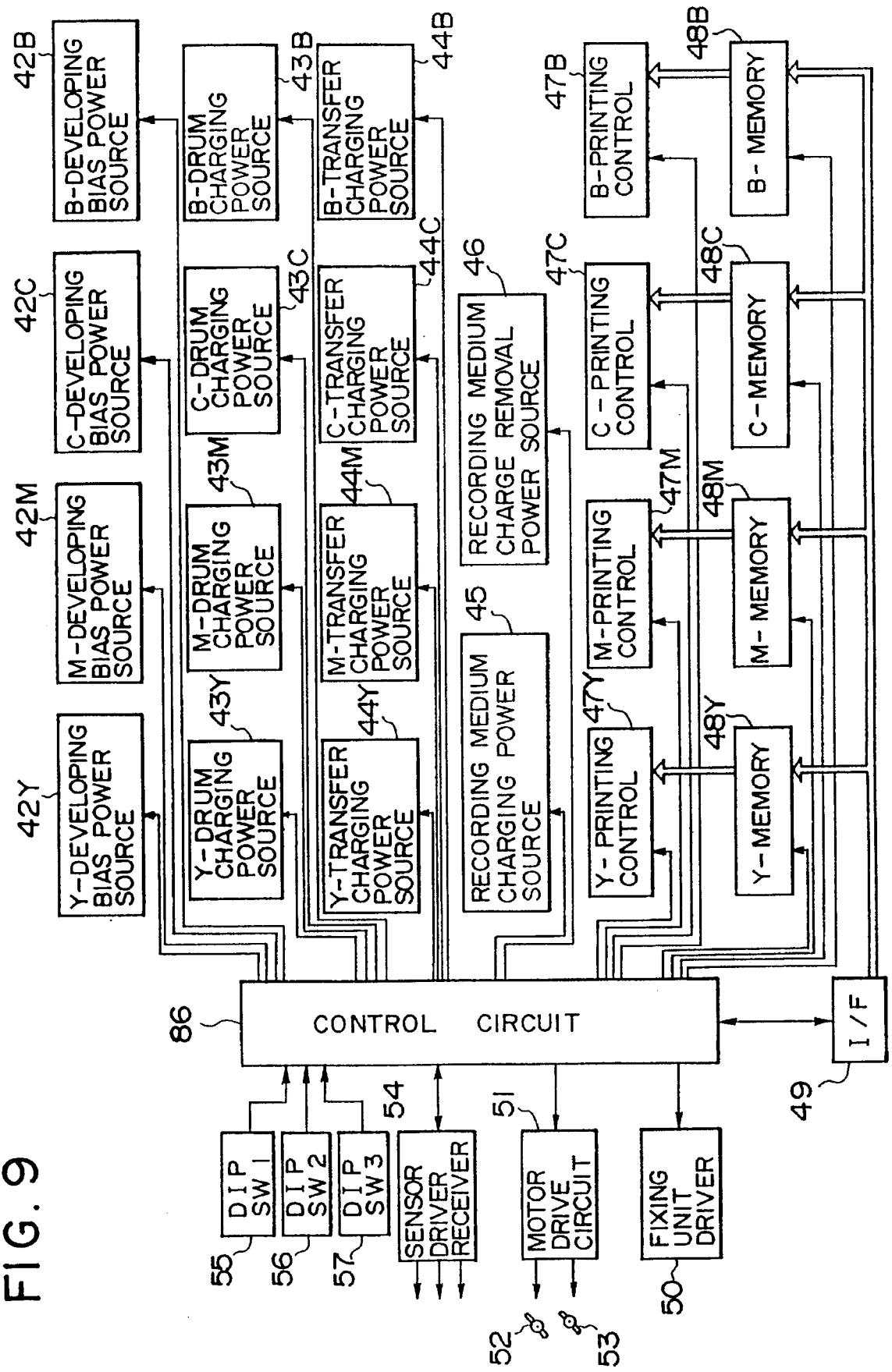
FIG. 9 is a block diagram showing a control system for the color printer of the third embodiment.

FIG. 9 is a block diagram showing a control system in the third embodiment. The control system of the printer 81 of the third embodiment is constituted in almost the same manner as that in the first embodiment shown in FIG. 3, and a control circuit 86 controls the operation of the printer 81. The control circuit 86 includes a timer in addition to microprocessors and memories. Other constitution is similar to that in the first embodiment, so its description is omitted.

Operation of the third embodiment is described as follows. After implementing a predetermined initialization upon the power-on, as well as the first embodiment, the control circuit 86 reads set values of the DIP switches 55, 56, 57 setting error portions among the respective printing mechanisms in the main scanning direction of the recording medium and stores them in an internal memory or memories. The control circuit 86 then heats the heat roller 35 inside the fixing unit 34, drives the drive roller 10, and thereby moves the carrier belt 82. After the photosensor 83 detects the home mark 82c on the carrier belt 82, an initialization is executed.

The control circuit 86 previously stores predetermined test patterns in the memories 48Y, 48M, 48C, 48B. After the photosensor 83 detects the home mark 82c, the respective printing mechanisms $P_1$, $P_2$, $P_3$, $P_4$ print test patterns stored in the memories 48Y, 48M, 48C, 48B at once with four colors on the carrier belt 82. There describes detailed description as follows.

The charging power sources 43Y, 43M, 43C, 43B of the respective printing mechanisms $P_1$, $P_2$, $P_3$, $P_4$ charge the surfaces of the respective photosensitive drums 6. The control circuit 86 then gives instructions to the memories 48Y, 48M, 48C, 48B and has the test patterns of one line portion transmitted to the respective printing control circuits 47Y, 47M, 47C, 47B. The respective printing control circuits 47Y, 47M, 47C, 47B, according to the instructions from the control circuit 86, transform the transmitted test patterns to data receivable by the LED heads 3, transmit them to the LED heads 3 of the respective printing mechanisms, and form an electrostatic latent image of one line portion on the surface of the respective photosensitive drums 6 evenly charged. Thus, the test patterns of one line portion transmitted from the respective memories 48Y, 48M, 48C, 48B are subsequently written as an electrostatic latent image on the surface of the respective photosensitive drums 6 of the respective printing mechanisms. The test patterns are completed by the latent image of a predetermined number of lines, and writing ends.

Figure 10:
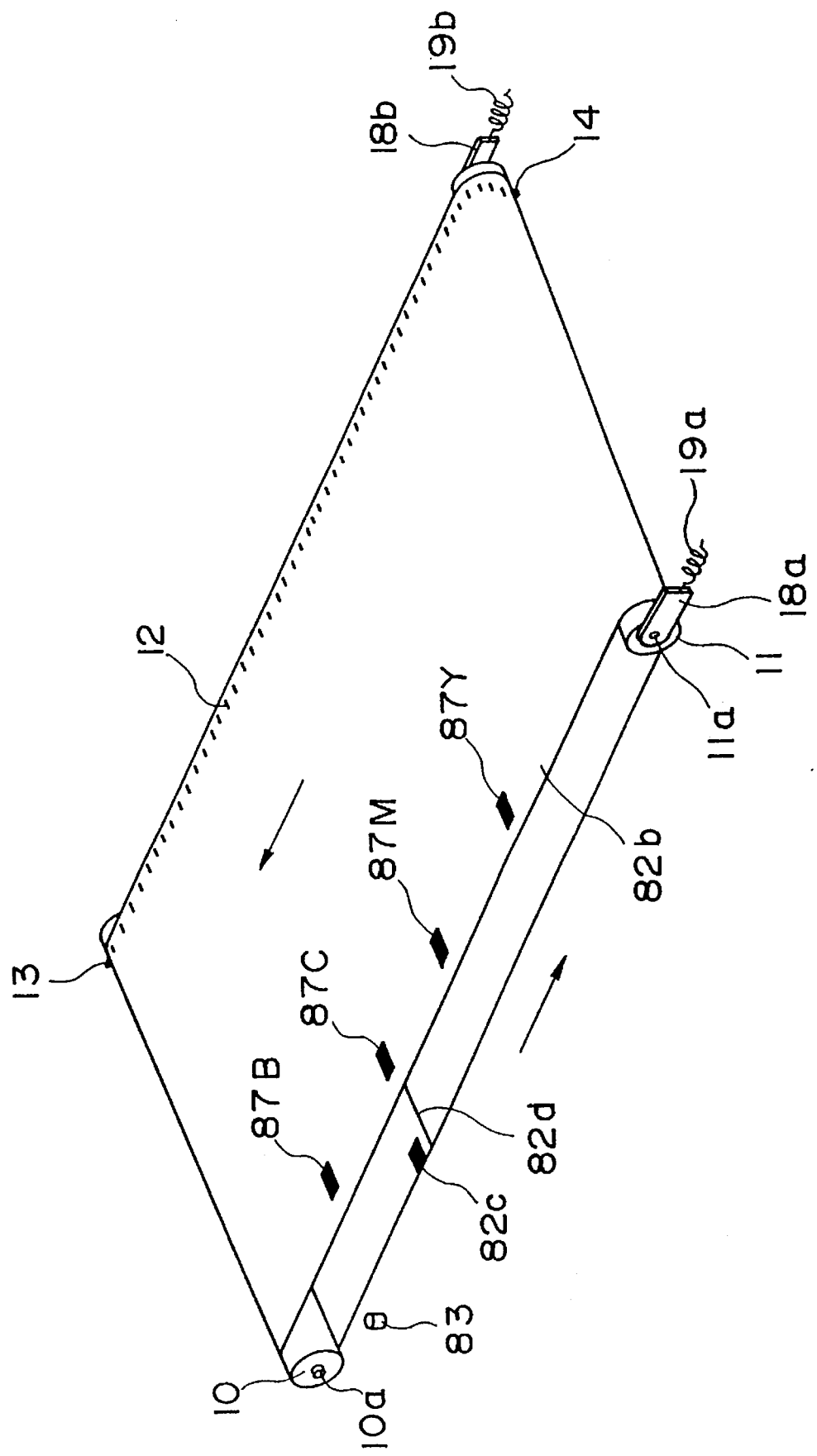
FIG. 10 is a perspective view showing the carrier belt in the third embodiment to which test patterns are transferred.

The surfaces of the respective photosensitive drums 6 on which the electrostatic latent image is formed are visualized by clinging toner of the respective colors on the surfaces of the respective developing rollers 8a charged from the bias power sources 42Y, 42M, 42C, 42B for developer. By turning on the respective transfer charging power sources 44Y, 44M, 44C, 44B, the toner images of the respect colors on the surfaces of the respective photosensitive drums 6 are transferred at once electrically onto the carrier belt 82 by the respective transfer rollers 4. FIG. 10 is a perspective view showing the carrier belt in the third embodiment onto which the test patterns are transferred. As shown in the drawing, test pattern images 87Y, 87M, 87C, 87B are transferred on a side end 82b of the carrier belt 82 with spaces corresponding to transfer positions of the respective printing mechanisms $P_1$, $P_2$, $P_3$, $P_4$.

Figure 11:
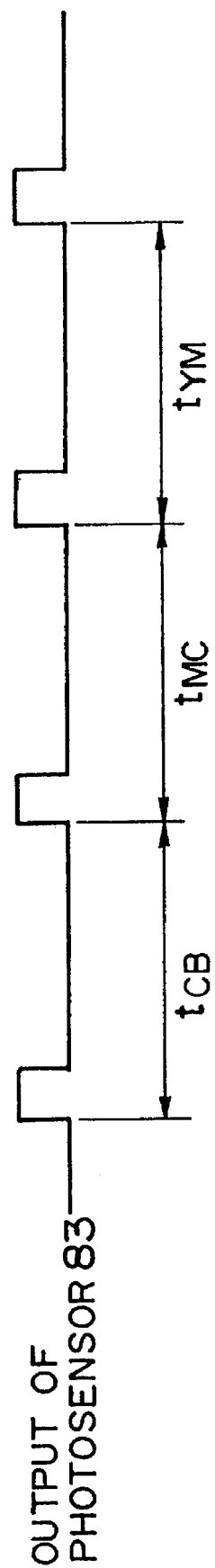
FIG. 11 is a time chart showing output waveforms of sensors in the third embodiment.

The carrier belt 83 continues to move even after transferring, so that the test pattern images 87Y, 87M, 87C, 87B return from the drive roller 10 and so that cross the photosensor 83 one by one. The photosensor 83 sequentially detects the respective crossing test pattern images 87Y, 87M, 87C, 87B. FIG. 11 shows an output waveform of the photosensor 83. In this drawing, first detected is the test pattern image 87B, and then, the test pattern images 87C, 87M, 87Y subsequently come out as the outputs. Detected time intervals of the respective pattern images are referred as to $t_{CB}$, $t_{MC}$, and $t_{YM}$, respectively.

Those times $t_{CB}$, $t_{MC}$, and $t_{YM}$ are determined by positional intervals of the respective printing mechanisms $P_1$, $P_2$, $P_3$, $P_4$. In order to make printing color-shift-free with respect to all four colors, the respective printing mechanisms $P_1$, $P_2$, $P_3$, $P_4$ may print with differentials of those times $t_{CB}$, $t_{MC}$, and $t_{YM}$. Those times $t_{CB}$, $t_{MC}$, and $t_{YM}$ are measured with the timer in the control circuit 86 and stored in the memory in the control circuit 86 as well.

After passing the photosensor 83, the respective test pattern images 87Y, 87M, 87C, 87B are scraped off by the cleaning blade 84. This operation enables the printer to print on the recording medium, and the drive roller 10 is stopped when the photosensor 83 detects the home mark 82c on the carrier belt 82. Initialization thus ends, and the control circuit 86 waits for inputs of image data from the external devices.

Figure 12:
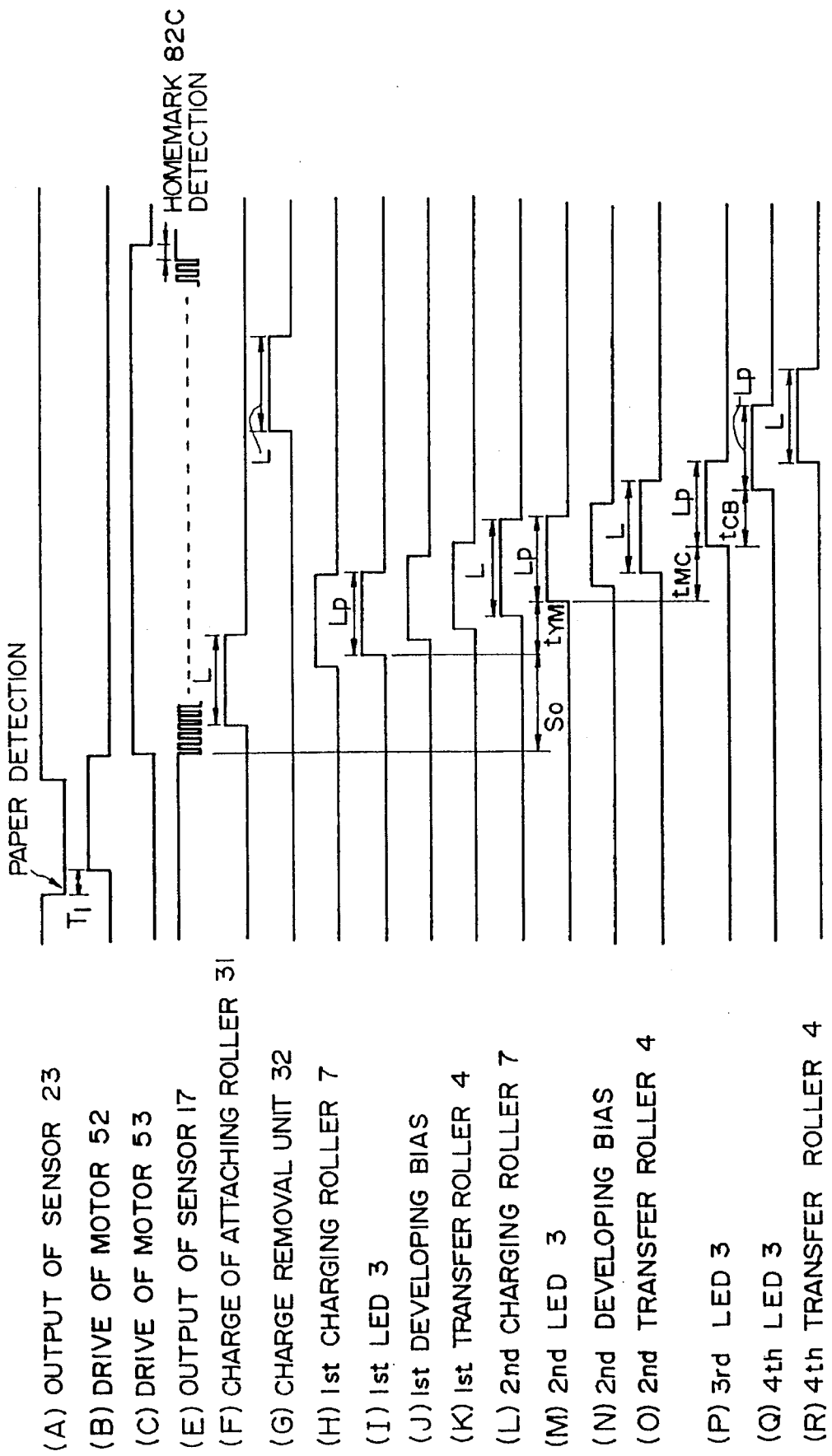
FIG. 12 is a time chart showing operation in the third embodiment.

FIG. 12 is a time chart showing operation of the third embodiment, and the subsequent operation is described according to this time chart. When image data is received from the external device, an inserted recording medium is pulled and attached to the carrier belt 82, and electrostatic latent images of the respective colors are formed on the respective photosensitive drums 6 at the respective printing mechanisms $P_1$, $P_2$, $P_3$, $P_4$. Latent image forming start time So of the LED head 3 in the printing mechanism $P_1$ can be determined based on a previously set drive time after the photosensor 83 detects the home mark 82c. The period from the latent image forming start time of the LED head 3 in the first printing mechanism $P_1$ to the latent image forming start time of the LED head 3 at the second printing mechanism $P_2$ is set to time $t_{YM}$. The period from the electrostatic latent image forming start time of the LED head 3 in the second printing mechanism $P_2$ to the electrostatic latent image forming start time of the LED head 3 at the third printing mechanism $P_3$ is set to time $t_{MC}$. The period from the electrostatic latent image forming start time of the LED head 3 in the third printing mechanism $P_3$ to the electrostatic latent image forming start time of the LED head 3 at the fourth printing mechanism $P_4$ is set to time $t_{CB}$. Since those set times $t_{CB}$, $t_{MC}$, and $t_{YM}$ are stored in the memory after measured at the initialization, those operations are executed by reading them out of the memory at the start of recording operation and by setting them to the timer in the control circuit 86. Setting times $t_{CB}$, $t_{MC}$, and $t_{YM}$ allows color shifts of respective colors in the sub scanning direction of the recording medium to be corrected automatically.

Regarding color shifts in the main scanning direction, as well as the first embodiment, since the printing start position of the LED head 3 can be controlled by one dot unit where the set values set in the DIP switches 55, 56, 57 are previously given as instructions for the respective printing control circuits 47Y, 47M, 47C, 47B, the printing start point in the main scanning direction can be adjusted within an error of one dot unit with respect to the colors.

According to the third embodiment as described above, a color printer capable of printing of excellent quality without color shifts can be provided because the color shifts are corrected by measuring positional errors in the sub scanning direction through transferring the test patterns to the carrier belt 82 and because the color shifts due to positional errors in the main scanning direction are corrected by setting them at the DIP switches 55, 56, 57.

Figure 13:
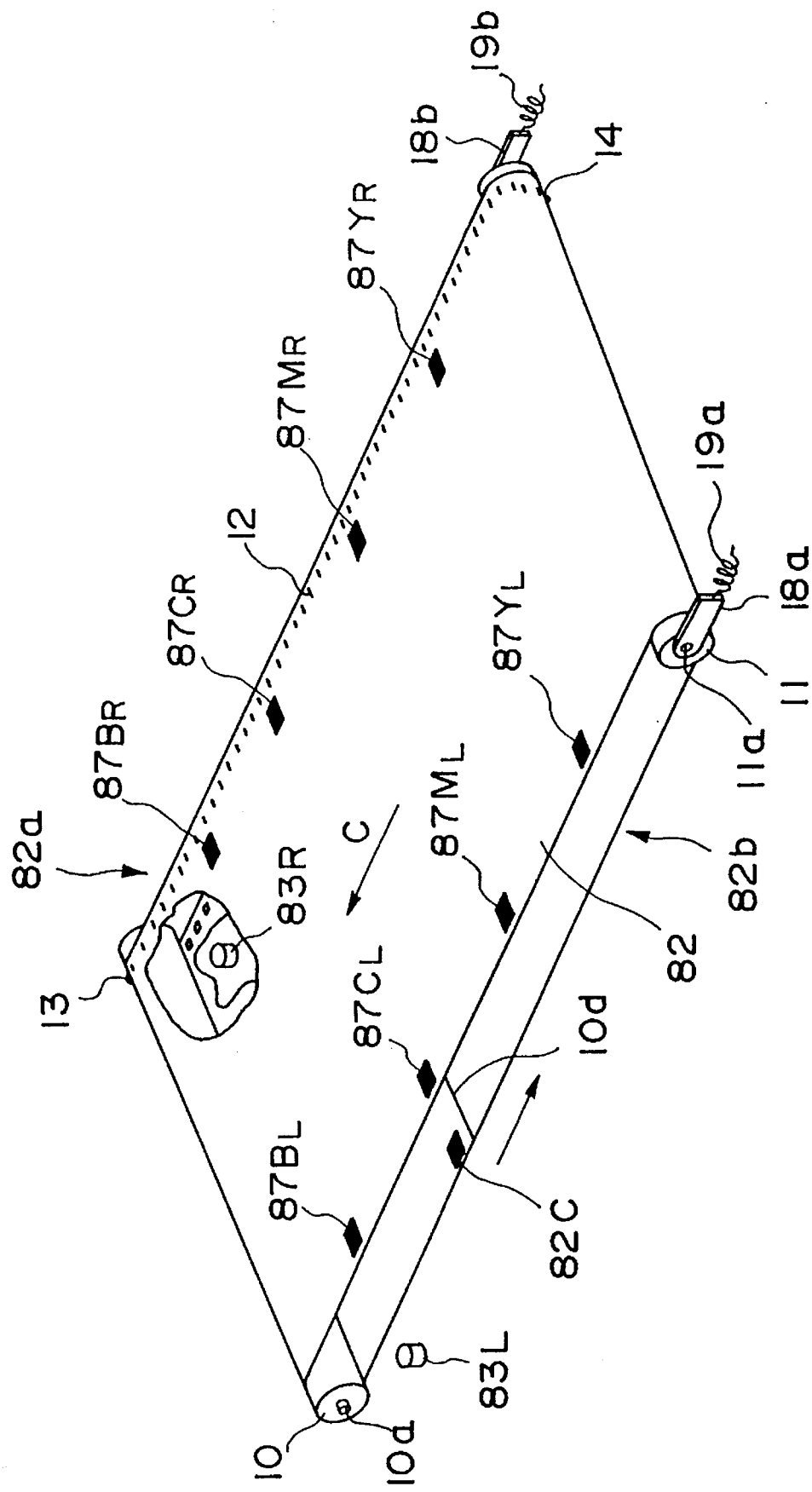
FIG. 13 is a perspective view showing a carrier belt in a fourth embodiment.
Figure 14:
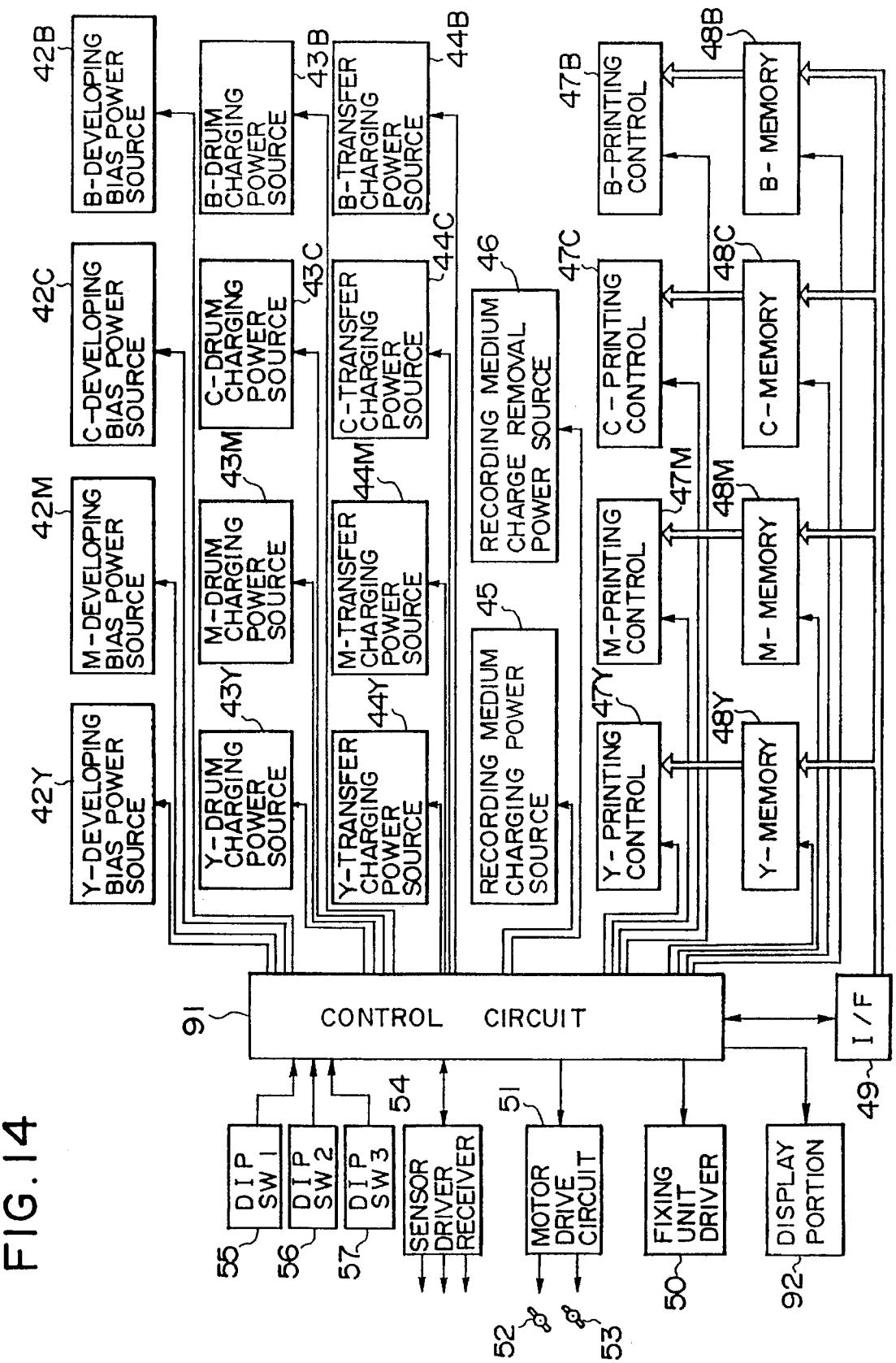
FIG. 14 is a block diagram showing a control system for the color printer of the fourth embodiment.

FIG. 13 is a perspective view showing a carrier belt in a fourth embodiment of the invention; FIG. 14 is a block diagram showing a control system of the color printer of the fourth embodiment; the fourth embodiment is described as follows. Although in the third embodiment the test patterns are to be transferred to one side of the carrier belt, test patterns of the respective colors are transferred onto both sides of the carrier belt to measure not only passing time differentials among the test patterns of the respective colors and but also passing time differentials between both sides of the test patterns of the same color, to detect parallel degrees among the respective printing mechanisms.

FIG. 13, a photosensor 83R and a photosensor 83L are arranged on one side 82a and the other side 82b, respectively, below the carrier belt 82 provided with tension between the drive roller 10 and the tension roller 11. The photosensors 83R, 83L are reflection type and detect the test pattern images transferred to the carrier belt 82. FIG. 13 shows a condition that the test pattern images are transferred onto the carrier belt 82; the test pattern images $87Y_R$, $87M_R$, $87C_R$, $87B_R$ are toner images of yellow, magenta, cyan, black transferred to one side 82a; the test pattern images $87Y_L$, $87M_L$, $87C_L$, $87B_L$ are toner images of yellow, magenta, cyan, black transferred to the other side 82b. Those test pattern images $87Y_R$, $87M_R$, $87C_R$, $87B_R$, $87Y_L$, $87M_L$, $87C_L$, $87B_L$ are formed by the respective printing mechanisms $P_1$, $P_2$, $P_3$, $P_4$ at a time of the initialization as well as the third embodiment.

In FIG. 14, a display portion 92 is connected to the control circuit 91 of the color printer of the fourth embodiment. The display portion 92 displays adjustment values to obtain parallel degrees in the main scanning direction for the respective printing mechanisms $P_1$, $P_2$, $P_3$, $P_4$. The other constitution is almost the same as the third embodiment.

Operation of the fourth embodiment is described as follows. The test pattern images $87Y_R$, $87M_R$, $87C_R$, $87B_R$, $87Y_L$, $87M_L$, $87C_L$, $87B_L$ are at once transferred to both sides 82a, 82b of the carrier belt 82 for conveying, by the respective printing mechanisms $P_1$, $P_2$, $P_3$, $P_4$. Transfer operation is the same as that in the third embodiment. The carrier belt 82 is further conveyed by the drive roller 10, thereby making the respective test pattern images cross the photosensor 83R or 83L. The photosensors 83R, 83L then detect those test pattern images. Their detected waveforms are shown in FIG. 15.

Figure 15:
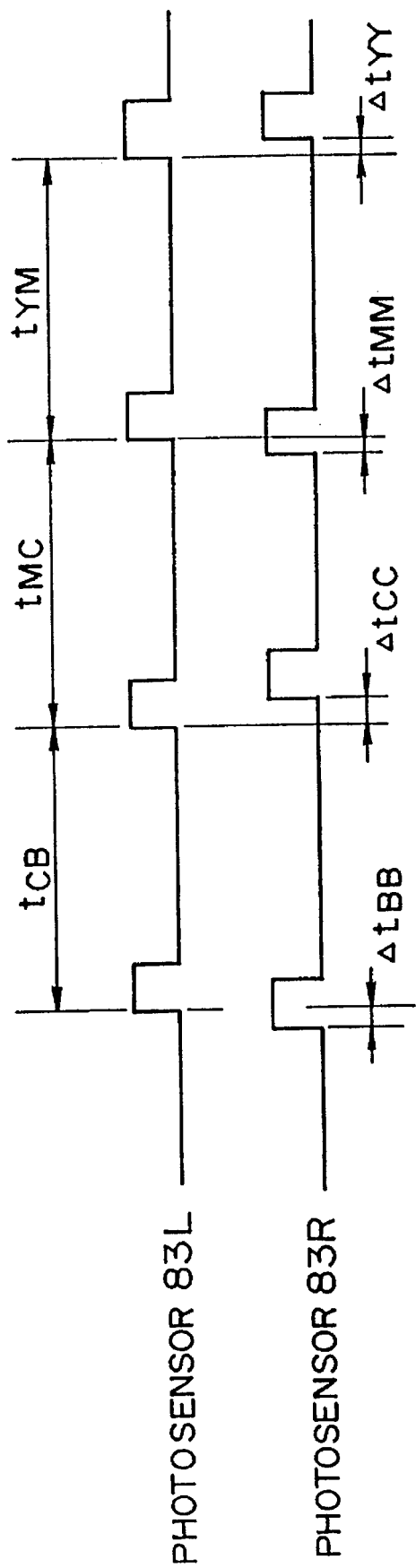
FIG. 15 is a time chart showing output waveforms of photosensors in the fourth embodiment.

In FIG. 15, times $t_{CB}$, $t_{MC}$, and $t_{YM}$ among the respective colors are passing time differentials including installment errors among the respective printing mechanisms $P_1$, $P_2$, $P_3$, $P_4$, and are the same to those of the third embodiment. Times $\Delta t_{BB}$, $\Delta t_{CC}$, $\Delta t_{MM}$, $\Delta t_{YY}$ represent parallel degrees of the respective printing mechanisms with reference to lines, as references, connecting between the photosensors 83R, 83L. If it represents zero, the printing mechanism is in parallel with the corresponding line; if it does not represent zero, the printing mechanism is not parallel, so that color shifts may occur.

Measured results $t_{CB}$, $t_{MC}$, and $t_{YM}$ and $\Delta t_{BB}$, $\Delta t_{CC}$, $\Delta t_{MM}$, $\Delta t_{YY}$ as described above are stored in the memory in the control circuit 91. The test pattern images 87Y$_R$, 87M$_R$, 87C$_R$, 87B$_R$, 87Y$_L$, 87M$_L$, 87C$_L$, 87B$_L$ which have passed the photosensors 83R, 83L, are scraped by a cleaning blade not shown. The carrier belt 82 further moves, and the drive motor 10 is then stopped after the photosensor 83L detects the home mark 82c again.

Among the measure values obtained during the initial operation above, the times $t_{CB}$, $t_{MC}$, and $t_{YM}$ are used as well as the third embodiment for printing operation on the recording medium. The measured values $\Delta t_{BB}$, $\Delta t_{CC}$, $\Delta t_{MM}$, $\Delta t_{YY}$ are information of the parallel degrees of the respective printing mechanisms; if it is not parallel, color shifts may occur, so that the respective printing mechanisms are required to be adjusted mechanically if not parallel. The control circuit 91 converts the measured values $\Delta t_{BB}$, $\Delta t_{CC}$, $\Delta t_{MM}$, $\Delta t_{YY}$ to adjustment values enabling a person to adjust mechanically, and displays the adjustment values at the display portion 92. Maintenance persons can understand which one of printing mechanisms is to be adjusted, and which direction and how much the mechanism should be adjusted, by looking at the displayed adjustment values.

Regarding the color shifts in the main scanning direction, as well as the first embodiment, since the printing start position of the LED head 3 can be controlled by one dot unit where the set values set in the DIP switches 55, 56, 57 are previously given as instructions for the respective printing control circuits 47Y, 47M, 47C, 47B, the printing start point in the main scanning direction can be adjusted within an error of one dot unit with respect to the colors.

According to the fourth embodiment as described above, the printing mechanisms regarding color shifts are readily, inexpensively adjusted by seeking the positional errors among the respective printing mechanisms in the sub scanning direction and the parallel degrees of the respective printing mechanisms through the formation of the test patterns to make the printing mechanisms adjustable.

It is to be noted that although in the third and fourth embodiments, the correction information about the respective printing mechanisms is obtained after the predetermined initialization is completed after its power-on, this invention is not limited to this operation. That is, this invention can obtain correction information of the respective printing mechanisms by giving instructions that the correction information is received from the operation panel of the color printer or from a host computer connected to the color printer.

As described in details, according to the invention, the color printer includes measuring means for measuring a moving amount of the medium carrier attaching and conveying a recording medium, setting means for setting positional errors of the printing mechanisms, and correcting means for correcting the measured values from the measuring means with the set values from the error setting means, so that the printing mechanism can prevent color printing from being shifted due to positional errors.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. A color printer having a plurality of sequentially arranged printing mechanisms for sequentially performing printing on a recording medium to form a color image on the recording medium, the color printer comprising:

a medium carrier for carrying the recording medium and moving the recording medium sequentially past each printing mechanism;

driving means for driving the medium carrier, whereby the recording medium moves through a plurality of positions past each printing mechanism;

position determining means for determining a determined position of the recording medium with respect to each printing mechanism, whereby an actual position of the recording medium with respect to each printing mechanism can be determined, the actual position differing from the determined position by an error factor;

error factor setting means for setting the error factor with respect to each printing mechanism; and correcting means for determining the actual position of the recording medium with respect to each printing mechanism based on the determined position and the error factor.

2. The color printer as set forth in claim 1 wherein the driving means drives the medium carrier in a moving direction, wherein the error factor includes a first component corresponding to an error in the moving direction and a second component corresponding to an error in a direction perpendicular to the moving direction, and wherein the error factor setting means sets the first component and the second component.

3. The color printer as set forth in claim 2 wherein the error factor setting means includes a dip switch for setting the error factor.

4. The color printer as set forth in claim 1 wherein the medium carrier comprises an electrically chargeable endless carrier belt, the recording medium being electrically attached thereto.

5. The color printer as set forth in claim 4 wherein the medium carrier comprises a synthetic resin film.

6. The color printer as set forth in claim 1 wherein the driving means drives the medium carrier in a moving direction, wherein the medium carrier has opposing sides extending substantially in parallel with the moving direction and a series of holes substantially evenly spaced along at least one side thereof, and wherein the driving means includes a plurality of projections for sequentially engaging the holes.

7. The color printer as set forth in claim 1 wherein the driving means drives the medium carrier in a moving direction, wherein the medium carrier is an endless carrier belt having substantially evenly spaced timing marks extending substantially in parallel with the moving direction, and wherein the position determining means includes detecting means for detecting the timing marks.

8. The color printer as set forth in claim 7 wherein the detecting means comprises photo-interrupter means.

9. The color printer as set forth in claim 7 wherein the medium carrier has a seam extending in a direction substantially perpendicular to the moving direction and a home mark indicating the seam, wherein the detecting means detects the home mark, and wherein by detecting the home mark the driving means is controlled to prevent the carrying of the recording medium on the seam.

10. A color printer having a plurality of sequentially arranged printing mechanisms for sequentially performing printing on a recording medium to form a color image on the recording medium, the color printer comprising:

a medium carrier for carrying the recording medium and for moving the recording medium sequentially past each printing mechanism;

driving means for driving the medium carrier, whereby the medium carrier moves through a plurality of positions past each printing mechanism;

test pattern forming means for simultaneously causing each printing mechanism to form a test pattern on the medium carrier as the medium carrier moves through the plurality of positions past each printing mechanism;

detecting means arranged with respect to the medium carrier for detecting a passage of the respective test pattern formed by each printing mechanism;

measuring means for measuring a time differential with respect to each test pattern, the time differential comprising the difference between a time the test pattern was expected to be detected and a time the test pattern is actually detected; and controlling means for controlling a print start time for each printing mechanism based on the respective time differential.

11. The color printer as set forth in claim 10 wherein the driving means drives the medium carrier in a moving direction, wherein the medium carrier is an endless carrier belt having a seam extending in a direction substantially perpendicular to the moving direction and a home mark indicating the seam, wherein the detecting means detects the home mark, and wherein by detecting the home mark the driving means is controlled to prevent the test pattern forming means from causing each printing mechanism to form a test pattern on the seam of the medium carrier.

12. The color printer as set forth in claim 11 further comprising time differential storing means for storing the time differentials of the respective printing mechanisms, wherein the controlling means controls the print start time for each printing mechanism with reference to the respective stored time differential.

13. The color printer as set forth in claim 12 wherein the time differential storing means comprises a memory associated with the controlling means.

14. The color printer as set forth in claim 10 wherein the color printer has an initialization period at the time of power-on, wherein the test pattern forming means causes each printing mechanism to form the test pattern on the medium carrier during the initialization period, and wherein the measuring means measures the time differential with respect to each test pattern during the initialization period.

15. The color printer as set forth in claim 10 wherein each measured time differential corresponds to a positional error of the respective printing mechanism.

16. The color printer as set forth in claim 10 wherein the medium carrier comprises an electrically chargeable endless carrier belt, the recording medium being electrically attached thereto.

17. The color printer as set forth in claim 16 wherein the medium carrier comprises a synthetic resin film.

18. The color printer as set forth in claim 10 wherein the driving means drives the medium carrier in a moving direction, wherein the medium carrier has opposing sides extending substantially in parallel with the moving direction and a series of holes substantially evenly spaced along at least one side thereof, and wherein the driving means includes a plurality of projections for sequentially engaging the holes.

19. A color printer having a plurality of sequentially arranged printing mechanisms for sequentially performing printing on a recording medium to form a color image on the recording medium, the color printer comprising:

a medium carrier for carrying the recording medium and for moving the recording medium sequentially past each printing mechanism;

driving means for driving the medium carrier in a moving direction, wherein the medium carrier has opposing sides extending substantially in parallel with the moving direction, and whereby the medium carrier moves through a plurality of positions past each printing mechanism;

test pattern forming means for simultaneously causing each printing mechanism to form a side test pattern on each side of the medium carrier as the medium carrier moves through the plurality of positions past each printing mechanism;

detecting means arranged with respect to each side of the medium carrier for detecting a passage of the respective side test pattern formed by each printing mechanism;

measuring means for measuring a side time differential with respect to each side test pattern, the side time differential comprising the difference between a time the side test pattern was expected to be detected and a time the side test pattern is actually detected; and controlling means for controlling a print start time for each printing mechanism based on the respective side time differentials.

20. The color printer as set forth in claim 19 wherein the medium carrier is an endless carrier belt having a seam extending in a direction substantially perpendicular to the moving direction and a home mark indicating the seam, wherein the detecting means detects the home mark, and wherein by detecting the home mark the driving means is controlled to prevent the test pattern forming means from causing each printing mechanism to form a test pattern on the seam of the medium carrier.

21. The color printer as set forth in claim 19 further comprising time differential storing means for storing the side time differentials of the respective printing mechanisms, wherein the controlling means controls the print start time for each printing mechanism with reference to the respective stored side time differentials.

22. The color printer as set forth in claim 21 wherein the time differential storing means comprises a memory associated with the controlling means.

23. The color printer as set forth in claim 19 wherein the color printer has an initialization period at the time of power-on, wherein the test pattern forming means causes each printing mechanism to form the side test patterns on the medium carrier during the initialization period, and wherein the measuring means measures the side time differential with respect to each test pattern during the initialization period.

24. The color printer as set forth in claim 19 wherein each measured side time differential corresponds to a side positional error of the respective printing mechanism.

25. The color printer as set forth in claim 19 wherein the medium carrier comprises an electrically chargeable endless carrier belt, the recording medium being electrically attached thereto.

26. The color printer as set forth in claim 25 wherein the medium carrier comprises a synthetic resin film.

27. The color printer as set forth in claim 19 wherein the medium carrier has a series of holes substantially evenly spaced along at least one side thereof, and wherein the driving means includes a plurality of projections for sequentially engaging the holes.

28. A color printer having a plurality of sequentially arranged printing mechanisms for sequentially performing printing on a recording medium to form a color image on the recording medium, the color printer comprising:

a medium carrier for carrying the recording medium and moving the recording medium sequentially past each printing mechanism, the medium carrier being an endless carrier belt;

driving means for driving the medium carrier, whereby the recording medium moves through a plurality of positions past each printing mechanism;

position determining means for determining a determined position of the recording medium with respect to each printing mechanism, whereby an actual position of the recording medium with respect to each printing mechanism can be determined, the actual position differing from the determined position by an error factor, the position determining means including a slit disc having substantially evenly spaced slits, the slit disc being arranged at the driving means to rotate at a rate corresponding to a rate of movement of the carrier belt, the position determining means also including detecting means for sequentially detecting the slits;

error factor setting means for setting the error factor with respect to each printing mechanism; and correcting means for determining the actual position of the recording medium with respect to each printing mechanism based on the determined position and the error factor.

29. The color printer as set forth in claim 28 wherein the driving means drives the medium carrier in a moving direction, wherein the error factor includes a first component corresponding to an error in the moving direction and a second component corresponding to an error in a direction perpendicular to the moving direction, and wherein the error factor setting means sets the first component and the second component.

30. The color printer as set forth in claim 29 wherein the error factor setting means includes a dip switch for setting the error factor.

31. The color printer as set forth in claim 28 wherein the medium carrier comprises an electrically chargeable endless carrier belt, the recording medium being electrically attached thereto.

32. The color printer as set forth in claim 31 wherein the medium carrier comprises a synthetic resin film.

33. The color printer as set forth in claim 28 wherein the driving means drives the medium carrier in a moving direction, wherein the medium carrier has opposing sides extending substantially in parallel with the moving direction and a series of holes substantially evenly spaced along at least one side thereof, and wherein the driving means includes a plurality of projections for sequentially engaging the holes.

34. The color printer as set forth in claim 28 wherein the driving means drives the medium carrier in a moving direction, wherein the medium carrier is an endless carrier belt having substantially evenly spaced timing marks extending substantially in parallel with the moving direction, and wherein the position determining means includes detecting means for detecting the timing marks.

35. The color printer as set forth in claim 34 wherein the detecting means comprises photo-interrupter means.

36. The color printer as set forth in claim 34 wherein the medium carrier has a seam extending in a direction substantially perpendicular to the moving direction and a home mark indicating the seam, wherein the detecting means detects the home mark, and wherein by detecting the home mark the driving means is controlled to prevent the carrying of the recording medium on the seam.

37. The color printer as set forth in claim 28 wherein the carrier belt is seamless.

* * * * *